United States Patent [19]

Amini et al.

[11] Patent Number: 5,542,055
[45] Date of Patent: Jul. 30, 1996

[54] SYSTEM FOR COUNTING THE NUMBER OF PERIPHERAL BUSES IN EACH HIERARCH CONNECTED TO PRIMARY BUS FOR CREATING MAP OF PERIPHERAL BUSES TO LOCATE PERIPHERAL DEVICES

[75] Inventors: Nader Amini; Kazushi Yamauchi, both of Boca Raton, Fla.

[73] Assignee: International Business Machines Corp., Armonk, N.Y.

[21] Appl. No.: 70,134

[22] Filed: May 28, 1993

[51] Int. Cl.⁶ .................................................. G06F 15/02
[52] U.S. Cl. .................... 395/281; 395/290; 395/307; 364/240.2; 364/251.3; 364/942.7; 364/DIG. 1
[58] Field of Search ...................................... 395/275, 375, 395/500, 700, 800, 200, 281, 290, 307, 821

[56] References Cited

U.S. PATENT DOCUMENTS

| | | | |
|---|---|---|---|
| 4,660,141 | 4/1987 | Ceccon et al. | 395/329 |
| 4,754,488 | 6/1988 | Lybe | 382/162 |
| 4,855,899 | 8/1989 | Presant | 395/856 |
| 4,868,814 | 9/1989 | Berkovich et al. | 370/85.1 |
| 4,912,633 | 3/1990 | Schweizer et al. | 395/800 |
| 5,051,987 | 9/1991 | Conlor | 370/94.1 |
| 5,249,261 | 9/1993 | Natarajan | 395/51 |
| 5,359,715 | 10/1994 | Heil et al. | 395/308 |
| 5,369,777 | 11/1994 | Cephardt et al. | 395/800 |
| 5,379,384 | 1/1995 | Solomon | 395/308 |

FOREIGN PATENT DOCUMENTS

| | | |
|---|---|---|
| 0443876A2 | 2/1991 | European Pat. Off. . |
| 0515253A1 | 5/1992 | France . |

OTHER PUBLICATIONS

"PCI promises solution to local–bus bottleneck" by Warren Andrews, Computer Design, Aug. 1992, pp. 36–40.

*Primary Examiner*—Thomas C. Lee
*Assistant Examiner*—Moustafa Mohamed Meky
*Attorney, Agent, or Firm*—Daniel E. McConnell

[57] ABSTRACT

The present invention provides a program that creates a preliminary map of a multiple bus network used to connect peripheral devices to the central processing unit of an information handling system. This preliminary map is then used by configuration software of the information handling system to locate the peripheral devices in the multiple bus network to configure them. If the physical configuration of the multiple bus network should change in any way, the inventive program can make corresponding changes in the preliminary map without having to rewrite or change the program.

23 Claims, 17 Drawing Sheets

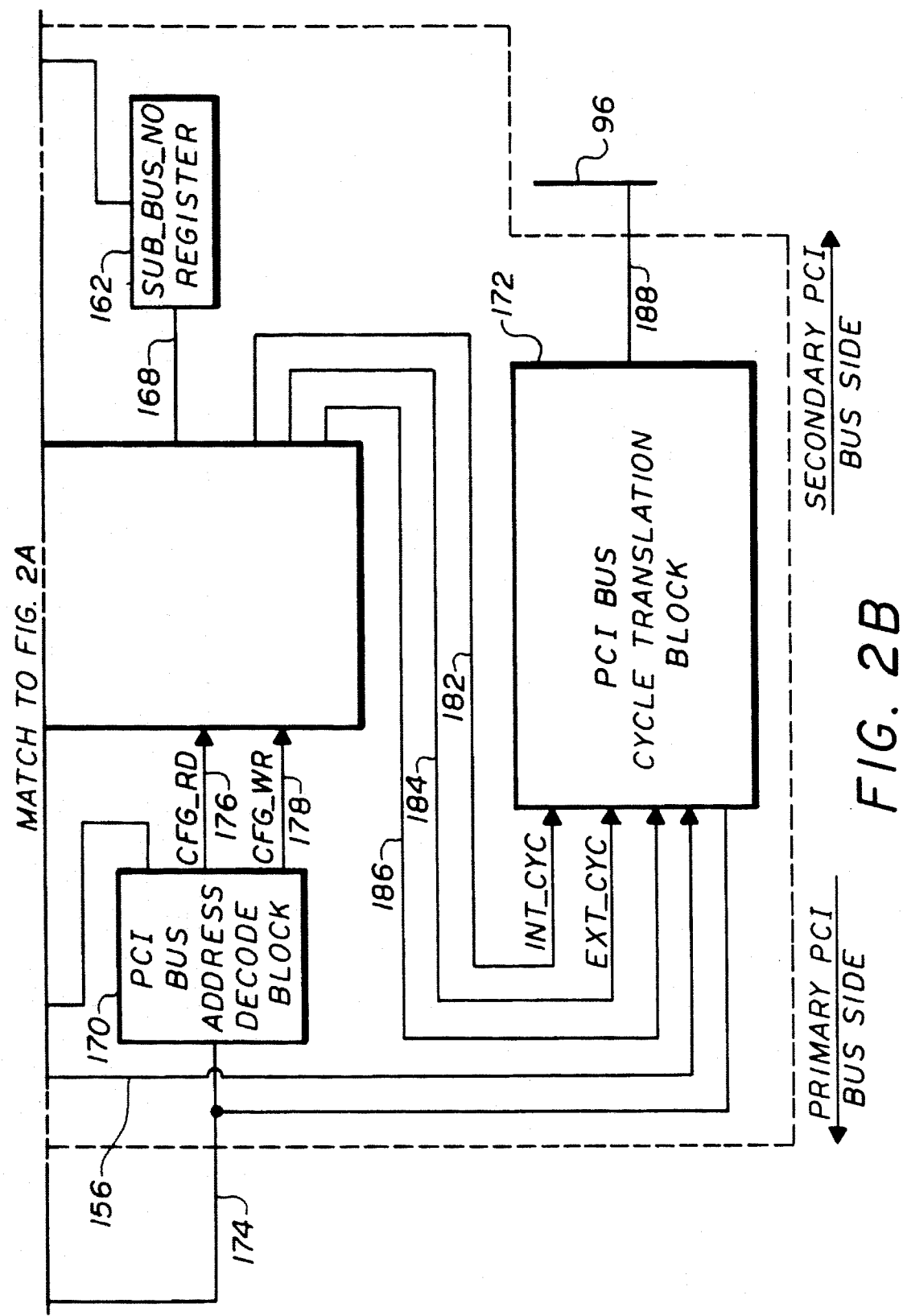

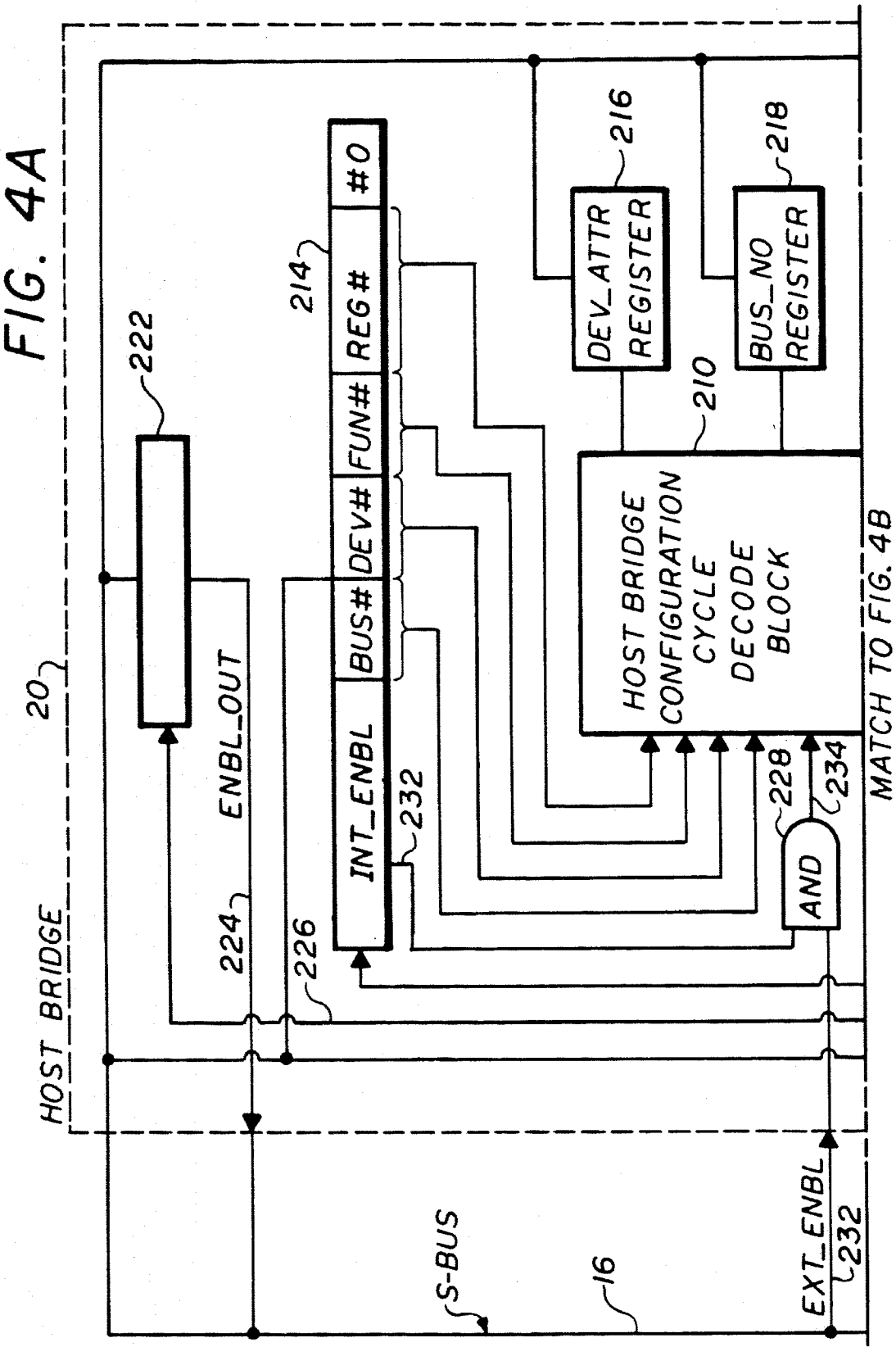

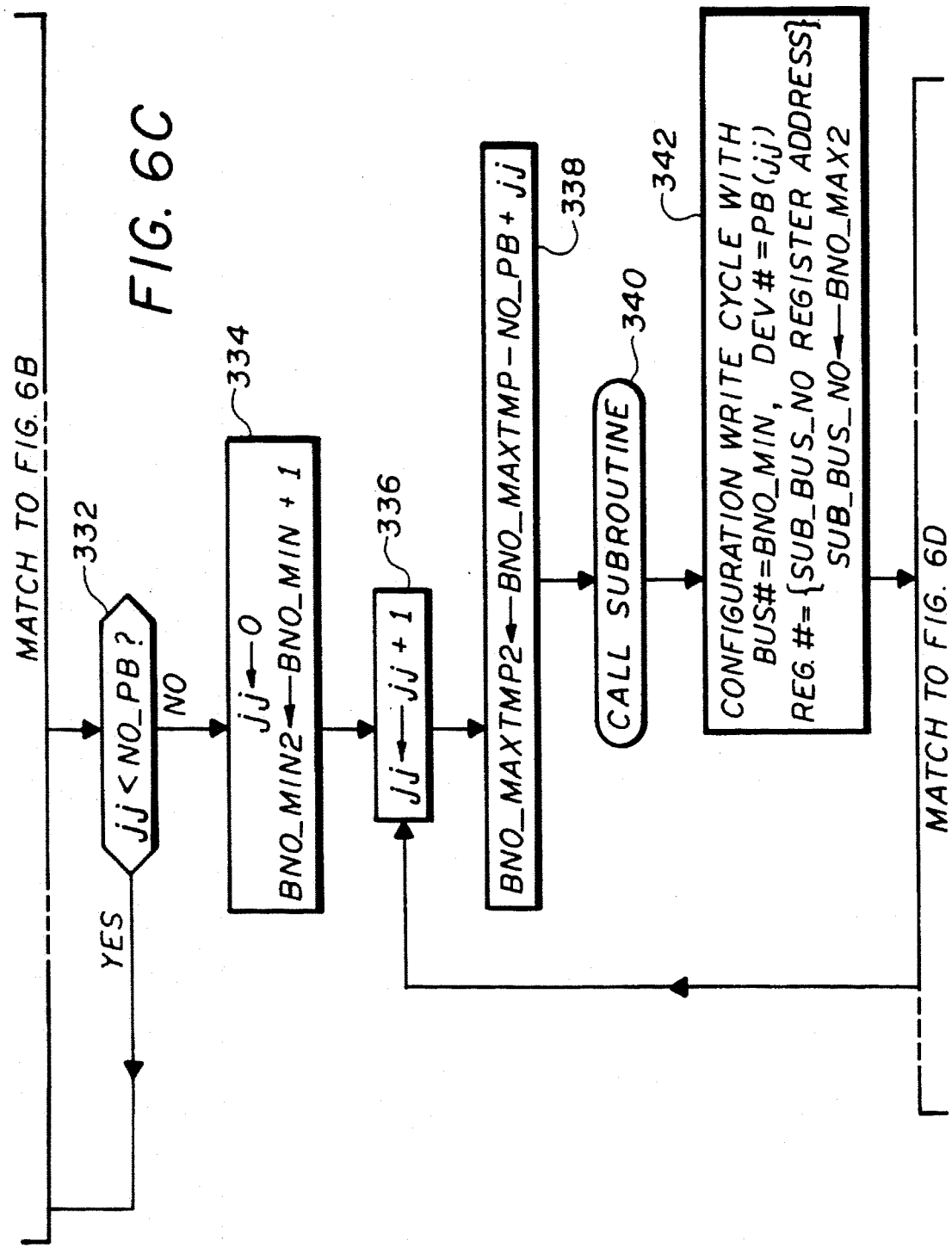

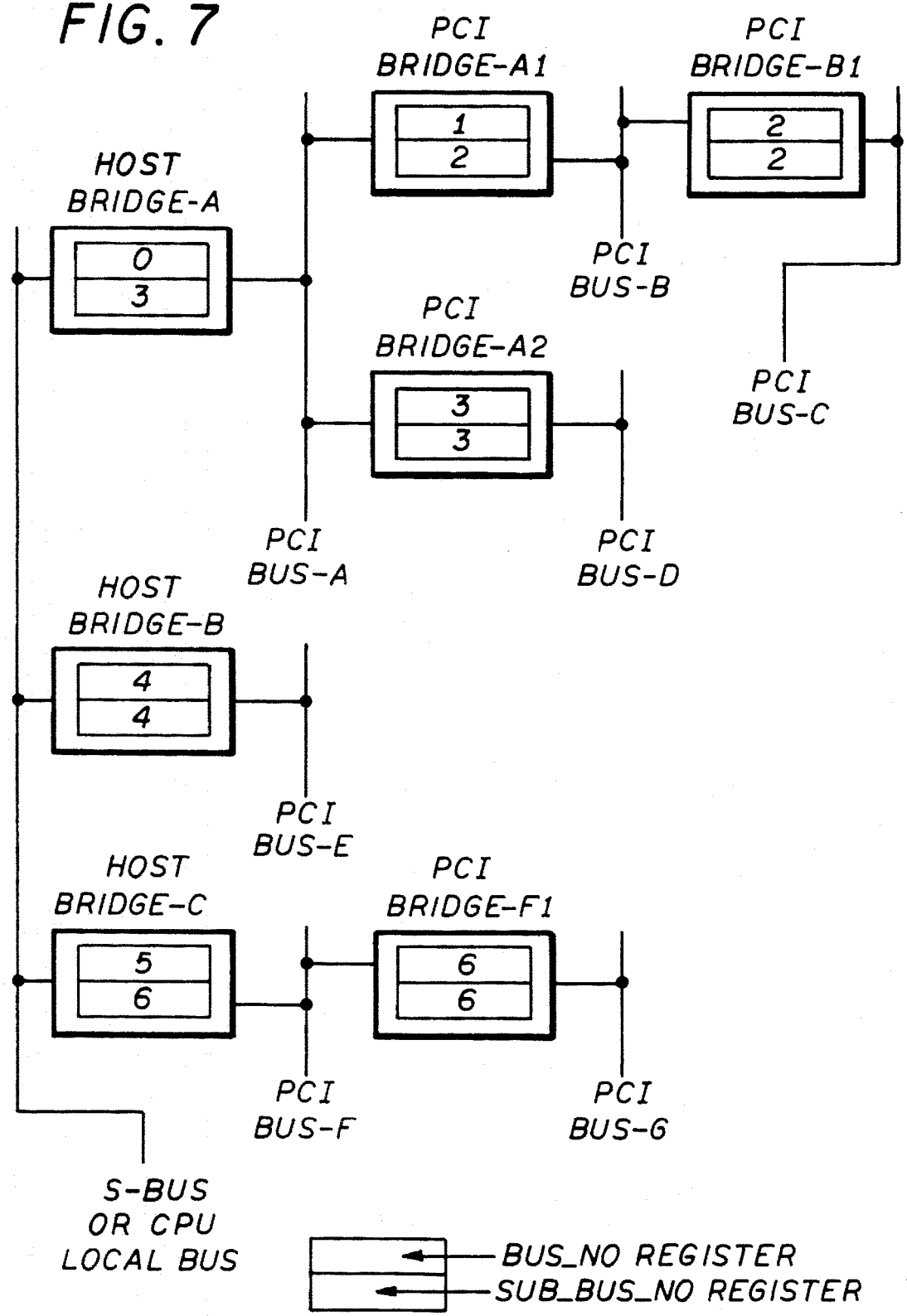

ively to information handling systems and more specifically to a method and apparatus for initializing multiple bus networks in an information handling system.

SYSTEM FOR COUNTING THE NUMBER OF PERIPHERAL BUSES IN EACH HIERARCH CONNECTED TO PRIMARY BUS FOR CREATING MAP OF PERIPHERAL BUSES TO LOCATE PERIPHERAL DEVICES

RELATED APPLICATIONS

The following United States patent applications are incorporated herein by reference as if they had been fully set out: application Ser. No. 08/068,477 Filed May 28, 1993, now U.S. Pat. No. 5,450551, Entitled "DIRECT MEMORY ACCESS (DMA) CYCLE LOGIC FOR MULTIPLE BUS COMPUTER SYSTEM";
application Ser. No. 08/069,253 filed May 28, 1993, now U.S. Pat. No. 5,396,602, Entitled "ARBITRATION LOGIC FOR MULTIPLE BUS COMPUTER SYSTEM RELATED APPLICATIONS";
application Ser. No. 08/069,230 Filed May 28, 1993, still pending, Entitled "ERROR CAPTURE LOGIC FOR PERIPHERAL BUS IN MULTIPLE BUS COMPUTER SYSTEM";
application Ser. No. 08/068,882 filed May 28, 1993, now U.S. Pat. No. 5,448,703, Entitled "METHOD AN APPARATUS FOR PROVIDING BACK-TO-BACK DATA TRANSFERS IN AN INFORMATION HANDLING SYSTEM HAVING A MULTIPLEXED BUS";
application Ser. No. 08/069,234 Filed May 28, 1993, still pending, Entitled "METHOD AND APPARATUS FOR PROVIDING ACCURATE AND COMPLETE COMMUNICATION BETWEEN DIFFERENT BUS ARCHITECTURES IN AN COMMUNICATION BETWEEN DIFFERENT BUS ARCHITECTURES IN AN INFORMATION HANDLING SYSTEM"; and
application Ser. No. 08/068,877 Filed May 28, 1993, still pending, Entitled "BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS".

FIELD OF THE INVENTION

The present invention relates generally to information handling systems and more specifically to a method and apparatus for initializing multiple bus networks in an information handling system.

BACKGROUND OF THE INVENTION

Referring generally to information handling systems, they normally have as their main component a central processing unit (CPU), which directs all communications in the system and orchestrates all commands to be executed by the information handling system. Information handling systems also usually have a network, or networks, of physical connection devices called buses. These networks connect the CPU to any number of peripheral devices so that the CPU can communicate with the peripheral devices.

In order for the CPU to communicate with a particular peripheral device in a multiple bus network, it must be able to locate the correct bus in the network to which the particular peripheral device is connected. Then the CPU must be able to locate the correct peripheral device on that bus with which it intends to communicate.

Accordingly, a computer system that includes a network of multiple buses and peripheral devices must create an "address map" which indicates the location of each bus and peripheral device. The address map is normally created during the start-up or initialization phase of the system which is generally called configuration.

During configuration, the CPU will access a software configuration program stored in the memory of the information handling system that will generate the address map. This configuration program will cause the CPU to access each peripheral device connected into the network to determine the amount of memory that each bridge and peripheral device requires in system memory and their location in the network. Then the CPU will reserve memory registers for each device and bus-to-bus bridge in the system's memory. After the memory locations are set for each device in memory, the configuration software causes the CPU again to access, and to "write" into, each peripheral device in the network the respective addresses of the registers in system memory that are reserved for it.

During normal communication between the CPU and the multiple bus network, each peripheral device is able to communicate with the CPU by either decoding or encoding the addresses of the registers reserved for it in system memory. Accordingly, by assigning memory locations to each peripheral device in the network, the configuration software program creates the address map of the network that is used during normal communication.

A problem exists with this method of creating the address map, however, because configuration software must be able to locate and access each bridge and peripheral device in the network before the address map is created. Thus, a "preliminary map" of the network must exist even before the address map can be created.

One known method used to create this preliminary map is to use another software program that is written to generate the preliminary map for a specific physical configuration of the network. This program then generates the preliminary map each time the computer system is initialized upon start-up. To write such a program, the programmer must know the exact and entire hierarchical and peer configuration of the buses and peripheral devices that comprise the network.

The problem with this method of creating the preliminary map is that it is inflexible. It is often desirable to change the physical configuration of the buses and devices that comprise the multiple bus network. For example, it may be desirable to add certain buses and peripheral devices to enhance the capabilities of the system.

If the preliminary map is created through a program that is specific to one physical configuration of the network, however, each time the location of a bus is changed or a bus or device is removed from the system, the program must be rewritten. Furthermore, the programmer must have detailed knowledge regarding the changes in the physical system configuration and must know the exact location of each bus in the system. In sum, using a software program that is specifically written for a certain physical bus configuration to create the preliminary map is clumsy and time consuming should changes later be required in the physical configuration of the network.

Another method for creating the preliminary map is to actually "hardwire" the preliminary map into each bus-to-bus bridge in the network. Bus-to-bus bridges are the hardware devices used to connect two buses together in the network. Thus, when the system is initialized on start-up the preliminary map of the entire network is already preset and fixed by default.

Inflexibility is an even greater problem when this method is used. In a multiple bus network that uses a hardwired preliminary map, the hardware that provides the location of the bus-to-bus bridges and buses in the map would have to be replaced or "rewired" each time a change in the physical configuration of the network is required.

Accordingly, a method and apparatus for initializing a multiple bus information handling system is needed that generates a preliminary map for buses in a multiple bus network that is not specific to any physical network configuration.

A method and apparatus for initializing a multiple bus information handling system is further needed that will generate a new and different preliminary map for the multiple bus network should changes be implemented in the physical configuration of the system.

Finally, a method and apparatus for initializing a multiple bus information handling system is further needed that does not require any additional hardware or that the preliminary map be hardwired into the network.

SUMMARY OF THE INVENTION

Accordingly, the present invention provides a program that creates a preliminary map of a multiple bus network. This preliminary map is then used by configuration software of the information handling system to locate the peripheral devices in the multiple bus network to configure them. If the physical configuration of the multiple bus network should change in any way, the program can make corresponding changes in the preliminary map without having to rewrite or change the program.

BRIEF DESCRIPTION OF THE DRAWINGS

FIGS. 2A and 2B are a block diagram of the configuration hardware of a bus-to-bus bridge;

FIGS. 4A and 4B are a block diagram of the configuration hardware of a host bridge;

FIGS. 6A through 6D are a flow chart of a subroutine called by the software program of FIGS. 5A through 5C; and FIG. 7 is a block diagram of a typical PCI network.

DETAILED DESCRIPTION OF THE PREFERRED EMBODIMENT

Figure 1A:
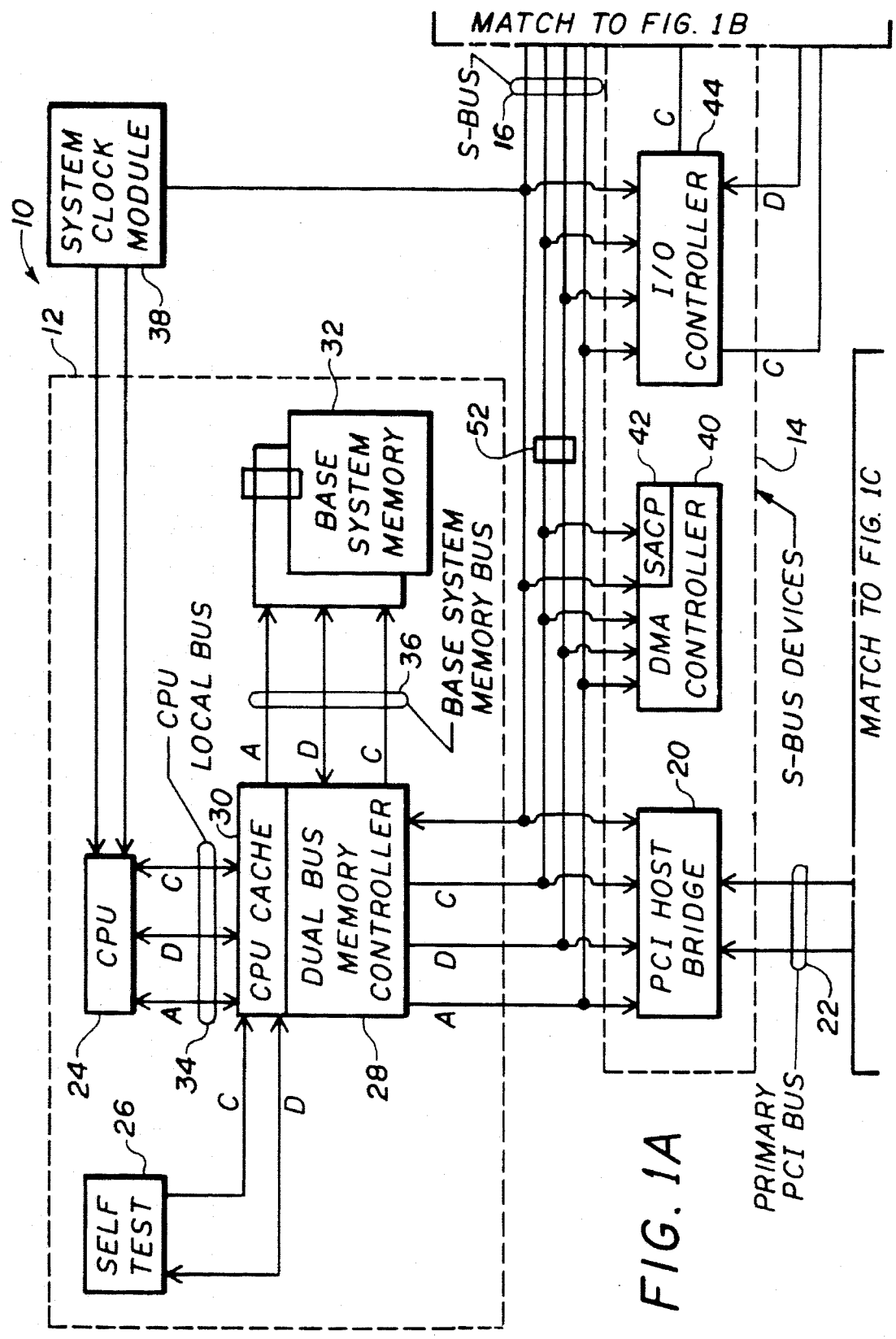
FIGS. 1A through 1C, taken together, are a schematic diagram of an information handling system with multiple buses.
Figure 1B:
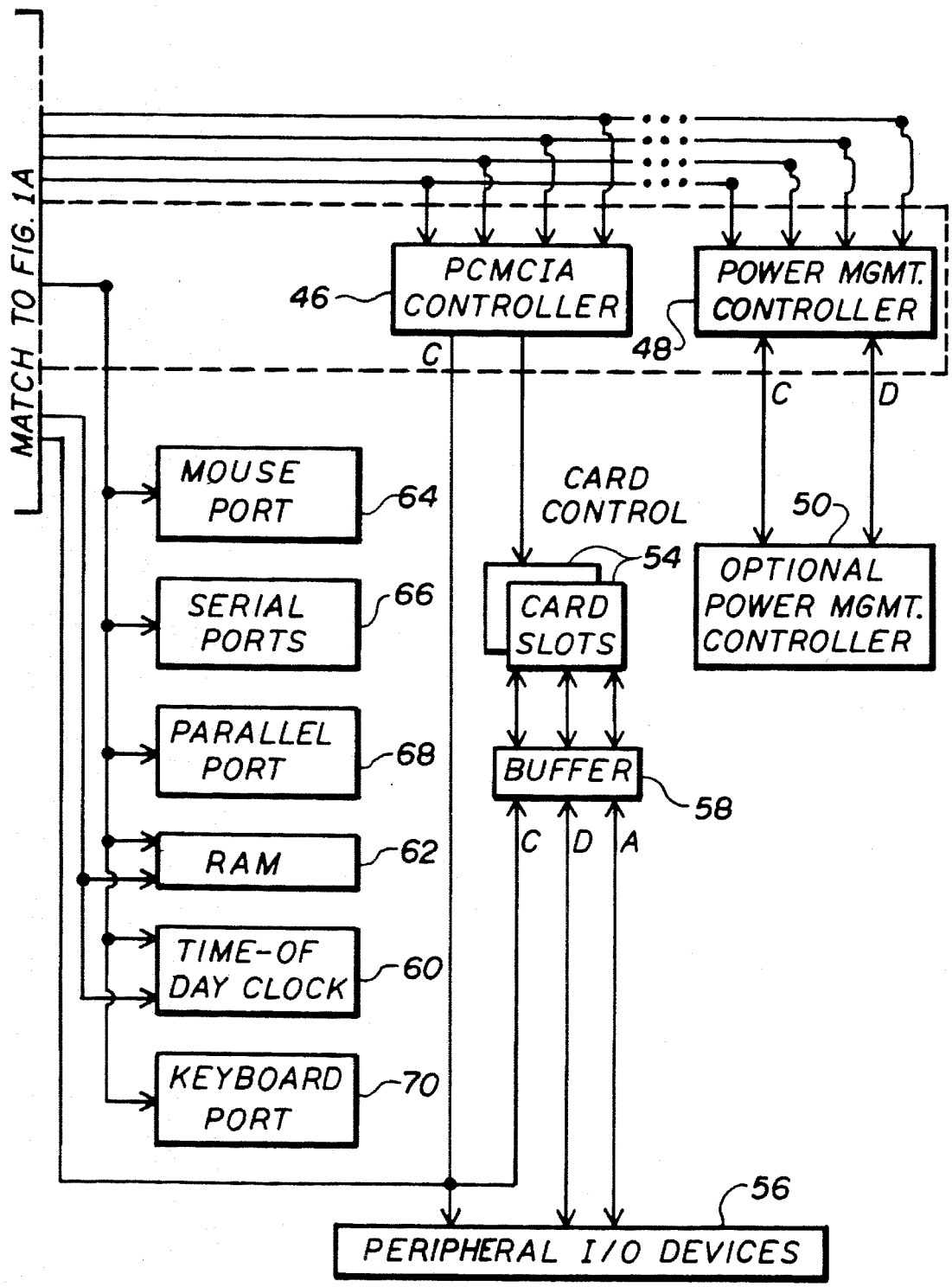
Figure 1C:
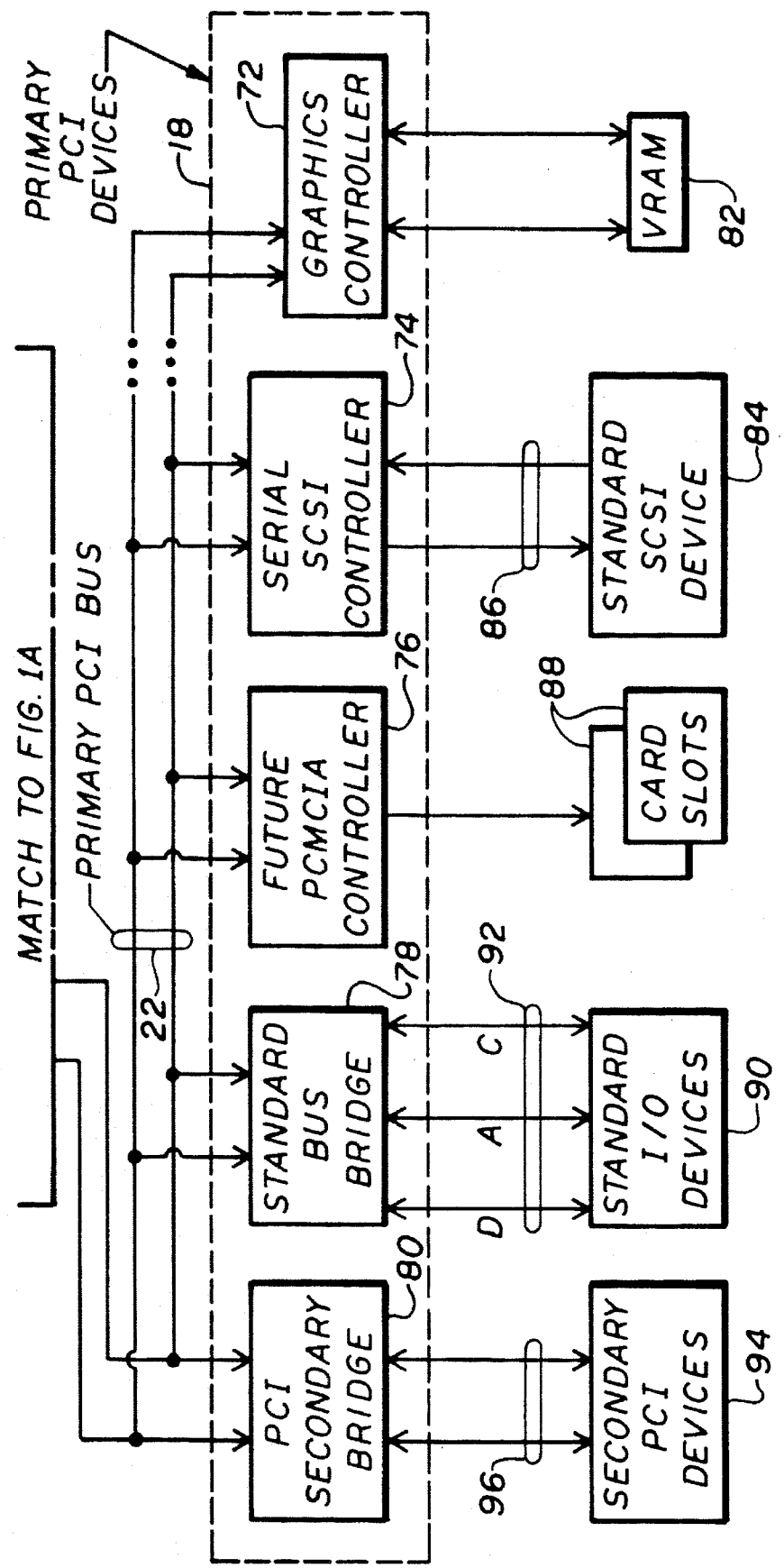

Referring now to FIGS. 1A–1C, a dual bus information handling system 10 is shown generally at 10, comprising, (i) a processor, cache and memory complex 12 connected to S-bus (system bus) devices 14 via an S-bus 16 and (ii) primary Peripheral Component Interconnect (PCI) devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIGS. 1A–1C will be provided hereinafter.

The processor, cache and memory complex 12 comprises a central processing unit (CPU) 24, a self-test circuit 26, a memory controller 28, a CPU cache 30, and base system memory 32. The CPU 24 in the preferred embodiment is a 32-bit microprocessor available from Intel, Inc. under the trade designation i486™, although it is contemplated that the system 10 may be implemented using other types of CPUs, especially x86-type microprocessors. The self-test circuit 26 provides a built-in-self-test (BIST) feature for the CPU 24 upon power-up. The self-test circuit also controls any self-test features which may be provided within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by an S-bus device 14 over the S-bus 16. Because the memory controller has the capability to manage operations on two buses, operations over the base system memory bus 36 and the CPU local bus 34 may be managed simultaneously. The CPU local bus 34, the base system memory bus 36, and the S-bus are 32-bit buses, each of which buses comprises data, address and control information paths as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM) which is used to temporarily store address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a memory cycle, the memory controller does not pass information onto the S-bus. However, if the memory controller determines that the operation it is managing is an I/O cycle, the memory controller propagates the information onto the S-bus for access thereto by an S-bus device. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S-bus devices 14, and a pair of clock signals for the CPU 24. In the preferred embodiment, the clock signal provided to the S-bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the S-bus devices are managed by the memory controller 28 over the 32-bit S-bus 16. Also attached to the S-bus, as shown in the preferred embodiment of FIGS. 1A–1C, are a direct memory access (DMA) controller 40, a system arbitration control point (SACP) 42, an input/output (I/O) controller 44, a PCMCIA controller 46, and a power management controller 48. An optional power management controller 50 may be attached to the power management controller 49 in case more sophisticated power management control is desired. A buffer 52 is provided on the S-bus 16 intermediate the DMA controller 40 and the I/O controller 44. As shown in FIGS. 1A–1C, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second high speed, high bandwidth bus, which in the preferred embodiment is the primary PCI bus 22. The PCI bus 22 is comprised of a new bus architecture called PCI. The primary PCI bus 22 is a high performance bus, meaning that it performs significant data transfer in a relatively short period of time, up to 120 megabytes of data per second. The PCI bus achieves this high level of performance, in part, because it may be directly linked to other high speed buses such as the S-bus 14, and thus may provide for a fast transfer of data between the CPU 24 or other S-bus devices 14 and the primary PCI devices 18. In fact, the operation of several high integration devices, such as certain graphics packages, require a direct link to a system bus such as the S-bus through a high performance bus like the PCI bus 22.

In addition, the PCI bus architecture does not require any "glue logic" to operate peripheral devices connected to it. Glue logic for other buses typically consists of miscellaneous hardware components such as a decoders, buffers or latches that are installed intermediate the peripheral devices and the bus.

The primary PCI bus 22 operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data.

The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while standard non-multiplexed buses typically require twice this number. Accordingly, because the number of signals are reduced, the number of pins required to support a device linked to the PCI bus is also reduced a corresponding amount. PCI architecture is thus particularly adapted for highly integrated desktop computer systems.

A more detailed description of the structure and operation of PCI bus architecture is provided in "Peripheral Component Interconnect (PCI) Revision 1.0 Specification" published Jun. 22, 1992; "Preliminary PCI System Design Guide", revision 0.6, published Nov. 1, 1992; "Peripheral Component Interconnect (PCI) Add-in Board/Connector Addendum", (Draft) published Nov. 6, 1992; and, "Peripheral Component Interconnect (PCI) Revision 2.0 Specification," published Apr. 30, 1993, all by the PCI Special Interest Group, the contents of which references are incorporated herein by reference as if they were fully set forth.

Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is itself an S-bus device residing on the S-bus. The PCI host bridge 20, then, serves as an interface between the S-bus 16 and the primary PCI bus 22 and provides an effective means of communication between these two buses, and any peripheral devices which may reside on these buses.

The PCI host bridge 20 is a low latency interconnect mechanism through which the CPU 24 or other S-bus device 14 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

The primary PCI bus 22 is capable of supporting a variety of devices which are PCI compatible. As shown in FIGS. 1A–1C, these devices may include a graphics controller 72, a serial SCSI (small computer systems interface) controller 74, a future PCMCIA controller 76, a standard bus (e.g., ISA or MICRO CHANNEL® ("MC-A")) bridge 78, and a PCI secondary bridge 80. The devices shown in FIGS. 1A–1C attached to the primary PCI bus, however, are only one example of a system implementing a PCI bus architecture and thus the disclosed configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A or ISA) bus 92 and the primary PCI bus 22. The architecture of an MC-A version of the standard bus bridge 78 is the subject of the following copending patent applications assigned to the IBM Corporation:

Secondary PCI devices 94 are connected to PCI bridge 80 via secondary PCI bus 96. Any number of unidentified secondary PCI devices 94 may be connected to the secondary PCI bus 96. The PCI bridge 80 serves as an interface between any number of PCI devices 94 attached to the secondary PCI bus 96 and the primary PCI bus 22.

Any number of peripheral devices compatible with the PCI bus architecture may be arranged on the primary PCI bus 22 with no other PCI buses present in the entire computer system 10; or any number of PCI peripheral devices could be attached to the primary PCI bus 22 with any number of secondary PCI buses, in addition to PCI bus 96, attached through the same number of separate, respective PCI bridges 80 to the primary PCI bus 22. Each secondary PCI bus could also have any number of additional PCI buses attached through PCI bridges to it and these "tertiary" PCI buses could have further PCI buses attached to them in various combinations. Similarly each PCI bus could have any number of PCI devices attached to it. Each connection between two PCI buses must be through a PCI bridge identical to bridge 80.

Furthermore, it is possible that a plurality of bridges identical to PCI host bridge 20 could be driven by the S-bus 16. Each of these host bridges could then have any number of PCI buses, bridges and devices connected to them in any arrangement that the designer of system 10 wishes. Thus, the portion of system 10 that is comprised of PCI bus architecture may be comprised of multiple buses and PCI peripheral devices arranged in various peer and hierarchical combinations (referred to hereinafter generally as a PCI network).

In addition, an alternate configuration of information handling system 10 eliminates S-bus 16 so that host bridge 20 connects primary PCI bus 22 directly to CPU local bus 34. If there were any other PCI host bridges in the system, they would also be connected directly to CPU local bus 34. In this configuration, any of the S-bus devices 14 could be connected directly to CPU local bus 34. Since S-bus 16 and CPU local bus 34 operate using the identical bus architectures, the invention, as described below, functions the same in this alternate embodiment as it does in the preferred embodiment described in FIGS. 1A–1C.

A peer combination may be a group of buses or PCI devices at one level of PCI network. For example, the graphics controller 72, standard bus bridge 78, and SCSI controller 74 are peers of each other. If there were several secondary PCI buses connected to the primary PCI bus 22, rather than only one (80), they would all be peers.

The hierarchical combination of the PCI network is merely the layers of PCI buses that are all connected to the primary PCI bus 22. For example, the secondary PCI bus 96 is on the second level of the hierarchy of the PCI network or "behind" or "beneath" PCI bridge 80.

In the preferred embodiment of the invention, the multiple bus network of the computer system is a PCI network as shown in FIGS. 1A–1C and described above. However, the invention described herein is not limited to PCI bus architecture, but is applicable to any multiple bus computer system in which a preliminary map of the bus network must be created before the system can be configured by the overall configuration software during initialization of the system.

In PCI bus architecture, each PCI bridge and PCI peripheral device has a configuration space. This configuration space consists of 256 bytes of register space. The configuration space of each peripheral device and bridge contains the data used by the overall configuration software to create the address map to be used during normal communications. Accordingly-, when the CPU 24 runs the configuration software, it must access and read or write to the configuration space of each device or bridge to configure the system and create the address map.

PCI BRIDGE CONFIGURATION HARDWARE

Figure 2A:
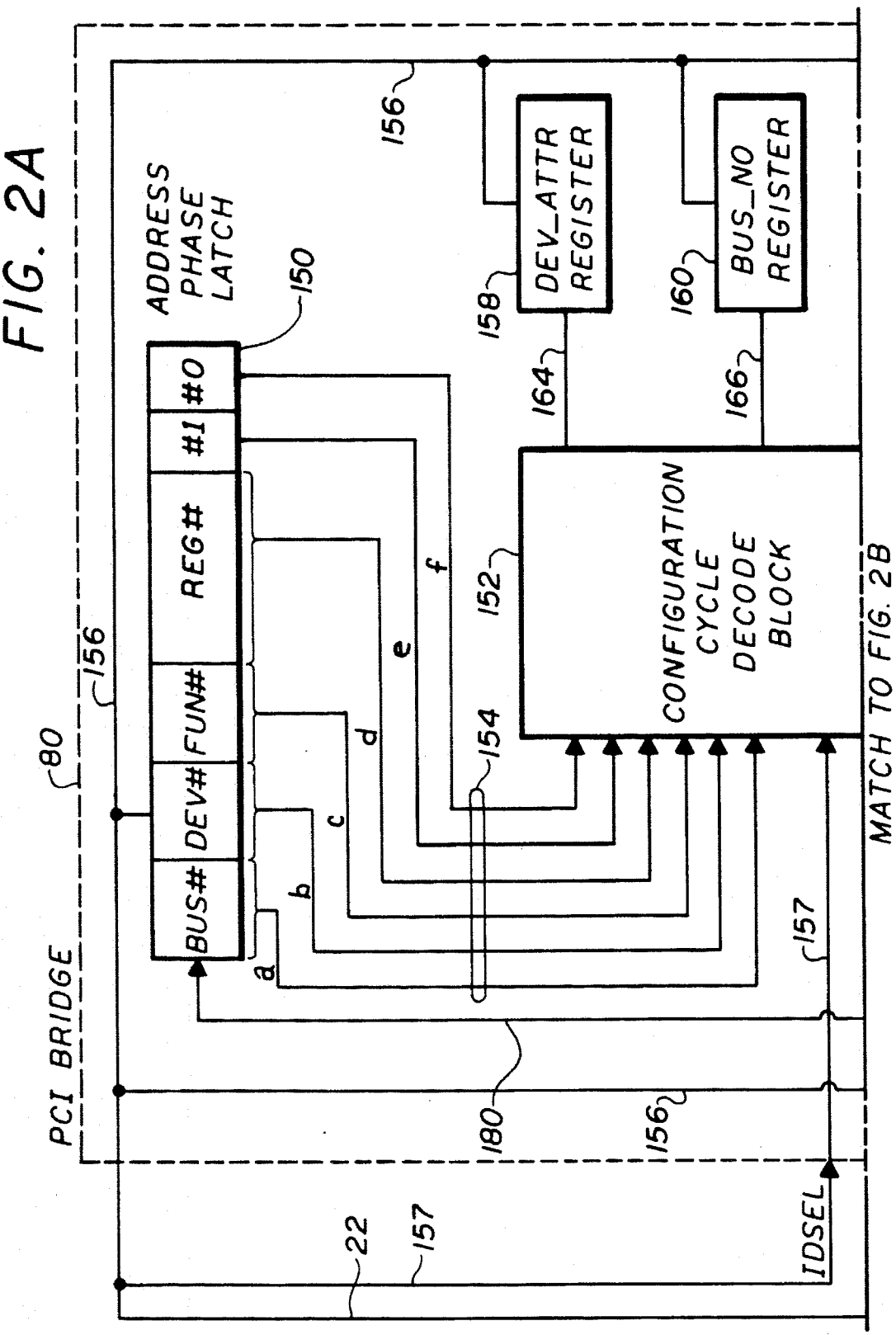

Referring now to FIGS. 2A–2B, a function block diagram of the configuration hardware of PCI bridge 80 is shown. PCI bridge 80 has two 32-bit registers called configuration address (CONFIG_AD) 150 and configuration data (CONFIG_DATA) (not shown), which are used specifically for configuration purposes. CONFIG_AD 150 is a latch, meaning that, once data is written into it, it will hold its contents until it receives a reset signal.

The CONFIG_AD 150 and CONFIG_DATA are connected to the primary PCI bus 22 through input line 156. The CPU transmits data over the primary PCI bus 22 and line 156 into CONFIG_AD 150 and CONFIG_DATA. CONFIG_AD 150 contains the location of the peripheral device or bridge the CPU 24 needs to configure based on the preliminary map and the location of the byte in that device's configuration space that must be accessed.

CONFIG_DATA contains the data that must be written into the device's or bridge's configuration space in the byte identified by CONFIG_AD 150. If the CPU is accessing a particular device or bridge to read data from its configuration space, then CONFIG_DATA will receive the data contained in the specific byte identified by CONFIG_AD 150 to be read by the CPU 24.

The first two bits of CONFIG_AD 150 are enable bits, bits numbers 0 and 1, that indicate whether a configuration space access (configuration cycle) should be run on the bus directly behind the PCI bridge 80, which in the preferred embodiment is PCI bus 96. Thus, if the value of these bits is "01" then the PCI bridge runs a configuration cycle on PCI bus 96.

The remaining bits of CONFIG_AD 150, except for bit numbers 24–31 which are unused, are divided into four specific fields. The first field is the BUS# field which is bit numbers 16–23 of CONFIG_AD 150. The BUS# field identifies the bus in the PCI network to which the device to be accessed is connected.

The second field is the DEV# field, which is bit numbers 11–15. This field identifies the device to be accessed.

The third field is the FUN# field, which is bit numbers 8–10. This field identifies an encoded value used to select 1 to 8 possible functions on the device specified by DEV#.

The fourth and last field is the REG# field which is bit numbers 2–7. This field identifies the register to be accessed in the configuration space of the device targeted by the configuration cycle.

The CONFIG_AD 150 is connected to a configuration cycle decode block (CONFIG BLOCK) 152 through a plurality of input lines 154a–f. CONFIG_AD 150 also is connected to the primary PCI bus 22 through line 156. CONFIG BLOCK 152 is also connected to the primary PCI bus 22 by an input line 157, labeled IDSEL.

Line 156 also connects three other registers in the PCI bridge 80 to the primary PCI bus 22; a device attribute register (DEV_ATTR) 158, a bus number register (BUS_NO) 160 and a sub-bus number register (SUB_BUS_NO) 162. The DEV_ATTR 158, BUS_NO 160 and SUB_BUS_NO 162 are also connected to CONFIG BLOCK 152 through lines 164, 166 and 168, respectively.

DEV_ATTR 158 may be at least one bit in length since its least significant bit (LSB) is the only bit used in configuration. The sole purpose of the DEV_ATTR 158 is to indicate whether the apparatus the DEV_ATTR 158 is contained in is a PCI bridge or a peripheral device. The LSB of DEV_ATTR 158 is always set to a 1 to indicate that PCI bridge 80 is, in fact, a PCI bridge. If DEV_ATTR 158 was in a peripheral device, it would always be set to 0.

BUS_NO 160 is 8 bits in length. The BUS_NO 160 contains an identification number for the bus directly behind PCI bridge 80, in this case, secondary PCI bus 96.

SUB_BUS_NO 162 is also 8 bits in length. The SUB_BUS_NO 162 contains an identification number of the bus with the highest identification number behind bridge 80, which is once again secondary PCI bus 96 since there are no other buses behind PCI bridge 80.

The identification numbers stored in BUS_NO 160 and SUB_BUS_NO 162 provide the preliminary map required for initialization of the PCI network explained above. The inventive method used to obtain these identification numbers is set forth in detail below.

PCI bridge 80 also has two other function blocks; a PCI bus address decode block (DECODE BLOCK) 170 and a PCI bus cycle translation block (TRANS BLOCK) 172. DECODE BLOCK 170 and TRANS BLOCK 172 are connected to the Primary PCI bus 22 through line 174. TRANS BLOCK 172 is also connected to the primary PCI bus 22 through line 156.

DECODE BLOCK 170 is connected to the CONFIG BLOCK 152 through output lines 176 and 178, identified as CFG_RD and CFG_WR, respectively. DECODE BLOCK 170 is also connected to CONFIG_AD 150 through an output line 180.

TRANS BLOCK 172 is connected to the CONFIG BLOCK 152 by an internal cycle line (INT_CYC) 182 and an external cycle line (EXT_CYC) 184. TRANS BLOCK 172 also receives input from CONFIG BLOCK 152 through an input line 186. TRANS BLOCK 172 is also connected to secondary PCI bus 96 through an output line 188.

The function of DECODE BLOCK 170 is to receive control signals from the CPU 24 through PCI bus 22 and line 174 and to translate them into a read or write enable signal to be sent to the CONFIG BLOCK 152 or CONFIG_AD 150. Enable signals to the CONFIG BLOCK 152 are generated on CFG_RD and CFG_WR and designate whether a particular configuration cycle will be a read or a write operation, respectively. In other words, if DECODE BLOCK 170 generates an enable signal on CFG_RD, then the present configuration cycle is a read operation. When DECODE BLOCK 170 enables line 180, it allows the CPU 24 to read or write into CONFIG_AD 150 through line 156 to begin a configuration cycle.

The CONFIG BLOCK 152 is the center of all configuration operations in PCI bridge 80. One function of CONFIG BLOCK 152 is to receive the contents of CONFIG_AD 150 through the plurality of lines 154a–f, receive the contents of BUS_NO 160 and SUB_BUS_NO 162, and compare the BUS# field of CONFIG_ADD 150 with the contents of BUS_NO 160 and SUB_BUS_NO 162. Then, based on this comparison and other information received from IDSEL 157, CONFIG BLOCK 152 determines whether the present configuration cycle is intended for a peripheral device attached to secondary PCI bus 96, a device attached to another bus in the PCI network that is located somewhere behind PCI bridge 80 (of course, however, the embodiment shown in FIGS. 1A–1C and FIGS. 2A–2B has no other PCI bridges), or the PCI bridge 80 itself.

If the configuration cycle is intended for any bus behind PCI bridge 80, CONFIG BLOCK 152 decodes the contents of CONFIG_AD 150 and transfers it to TRANS BLOCK 172. CONFIG BLOCK 152 will also send an enable signal to TRANS BLOCK 172 on EXT_CYC 184 if the present configuration cycle is targeted for a device linked to a bus behind PCI bridge 80.

If the configuration cycle is intended for the PCI bridge 80 itself, CONFIG BLOCK 152 will decode the REG# field to identify a register in its own configuration space and perform a read or write operation with respect to this internal register. If the configuration cycle is an internal one, CONFIG BLOCK 152 will also send an enable signal to TRANS BLOCK 172 on INT_CYC 182.

TRANS BLOCK 172 performs all of the timing and signal translation between primary PCI bus 22 and secondary PCI bus 96 so that signals may be passed back and forth between them. This translation is the primary function of PCI bridge 80 and is beyond the scope of the invention described herein.

With respect to configuration cycles, the only functions of TRANS BLOCK 172 is to transmit the decoded contents of CONFIG_AD 150 from CONFIG BLOCK 152 onto secondary PCI bus 96. TRANS BLOCK 172 will only perform this function when it receives an enable signal on EXT_CYC 184 from CONFIG BLOCK 152.

Figure 3A:
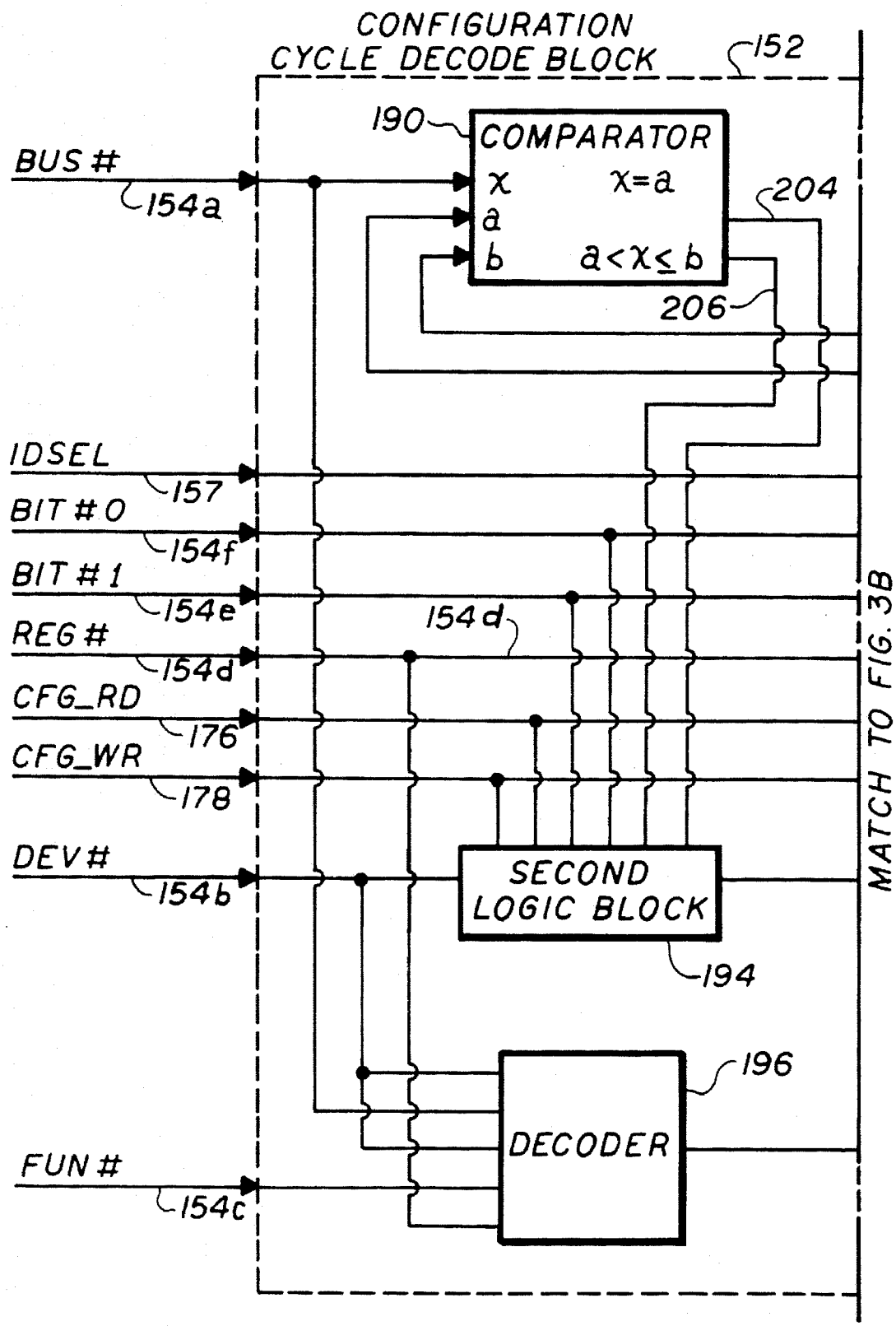
FIGS. 3A and 3B are a block diagram of a configuration cycle decode block in the bus-to-bus bridge of FIGS. 2A and 2B.
Figure 3B:
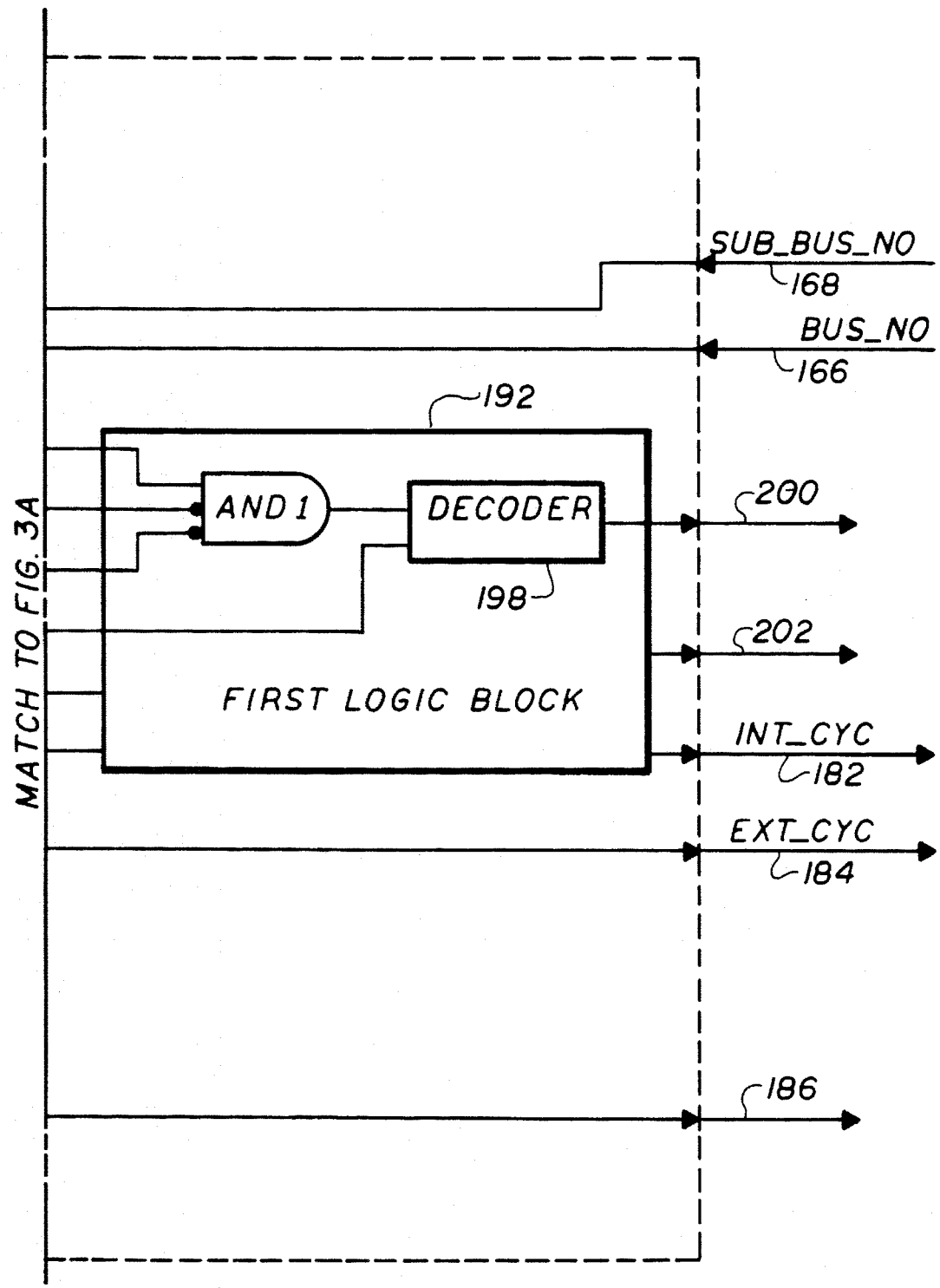

Referring now to FIGS. 3A–3B, a block diagram of CONFIG BLOCK 152 is shown. CONFIG BLOCK 152 includes a comparator 190, a first logic block 192, a second logic block 194 and a decoder 196, which are all connected by various signal lines as shown in FIG. 3. Logic block 192 includes a decoder 198 and an and gate (AND1).

The BUS# field of CONFIG_AD 150 is connected by line 154a to comparator 190 and decoder 196. The REG# field of CONFIG_AD 150 is connected by line 154d to decoders 196 and 198. The DEV# field of CONFIG_AD 150 is connected to logic block 194 and decoder 196 by line 154b. The FUN# field of CONFIG_AD 150 is connected to decoder 196 by line 154c.

Other inputs to CONFIG BLOCK 152 include IDSEL 157 and bit numbers 0 and 1 of CONFIG_AD 150 which are attached to AND1 of logic block 192. CFG_RD 176 and CFG_WR 178 are also both attached as inputs to logic blocks 192 and 194. BUS_NO 160 and SUB_BUS_NO 162 are both connected as separate inputs to comparator 190 through lines 166 and 168, respectively.

The output lines from logic block 192 are INT_CYC 182, a first output line 200 from decoder 198 and a second output line 202. As set forth below, these are all used to perform configuration cycles directed to internal registers of PCI bridge 80.

EXT_CYC 184 is the only output from logic block 194. Line 186 attaches the output of decoder 196 to TRANS BLOCK 172. Comparator 190 has two output lines 204 and 206.

In operation, when a configuration cycle is asserted by CPU 24 on primary PCI bus 22, PCI bridge 80 will interpret it as targeted for one of three destinations: a register within the configuration space of the PCI bridge itself; a register within the configuration space of a peripheral device or another PCI bridge attached to the secondary PCI bus 96; or a register within the configuration space of a peripheral device or PCI bridge attached to a PCI bus below secondary PCI bus 96 in the hierarchy of the PCI network.

To start a configuration cycle on the primary PCI bus 22, the CPU 24 sends control signals through primary PCI bus 22 to the DECODE BLOCK 170, which causes DECODE BLOCK 170 to send a write signal to CONFIG_AD 150 on line 180. This allows the CPU to write a configuration address into CONFIG_AD 150 and this address is latched there until CONFIG_AD 150 is reset by DECODE BLOCK 170. The contents of CONFIG_AD 150 is then accessed by CONFIG BLOCK 152 through plurality of lines 154a–f.

When the configuration cycle is directed to an internal register of the PCI bridge 80, the value of bit numbers 0 and 1 of CONFIG_AD 150 are set to "00". In addition, an enable signal is sent by the CPU 24 through the PCI host bridge 20 to the CONFIG BLOCK 152 on IDSEL 157.

The enable signal on IDSEL 157 and the "00" signal from bit numbers 0 and 1 of CONFIG_AD 150 are input to AND1 of logic block 192 which together generate an enabling high signal on the output of AND1. This signal energizes decoder 198 to decode the REG# field of CONFIG_AD 150. Decoder 198 then generates an output on line 200 which accesses the internal configuration register of PCI bridge 80 that corresponds to REG#.

Simultaneously, DECODE BLOCK 170 generates an enable signal on either CFG_RD 176 or CFG_WR 178, depending on whether a read or write operation, respectively, is to be executed during this particular configuration cycle. Logic block 192 passes the read or write command out on line 202 and a read or write operation is conducted on the internal register accessed by the decoder output on line 200. Logic block 192 also enables INT_CYC 182, which signals to TRANS BLOCK 172 that the configuration cycle is directed to the PCI bridge internally and no information is to be transmitted onto secondary PCI bus 96.

When the configuration cycle is not directed to the internal configuration space of PCI bridge 80, IDSEL is not enabled and bit numbers 0 and 1 of CONFIG_AD 150 have the value "01" as set by CPU 24 through PCI host bridge 20. Thus, these signals do not enable AND1 and decoder 198, and therefore, INT_CYC 182 is not activated and no internal configuration occurs.

Instead, after the configuration address is latched into CONFIG_AD 150, comparator 190 receives the BUS# field of CONFIG_AD 150 as an input through line 154a. At the same time, comparator 190 also receives the contents of BUS_NO 160 and SUB_BUS_NO 162 as inputs from lines 166 and 168, respectively.

Comparator 190 then compares the value of BUS# with the values of BUS_NO 160 and SUB_BUS_NO 162. If BUS_NO 160 is equal to BUS#, then the present configuration cycle is intended for a peripheral device or another PCI bridge attached to the secondary PCI bus 96, and line 204 is enabled by comparator 190, which activates decoder 196 and logic block 194.

When decoder 196 is activated, it decodes the DEV# field of CONFIG_AD 150 into a 21-bit value. Each bit number of the decoded 21-bit value may be attached to an the enable line (IDSEL) of a device or PCI bridge on secondary PCI bus 96. Thus, in the preferred embodiment, a maximum of 21 peripheral devices or PCI bridges can be attached to the secondary PCI bus 96, or any other PCI bus in the PCI network.

Only one of these bits will be set to an enabling high, or the value "1", with the rest being set to low, or "0". Thus, the decoded 21-bit value of DEV# will enable only the device on secondary PCI bridge 96 that is the target of the configuration cycle.

The decoder, when activated, also drives the value of bit numbers 0 and 1 of CONFIG_AD 150 to "00". This signals to the devices and PCI bridges attached to secondary PCI bus 96 that the present configuration cycle is targeted for one of them.

The decoder 196 simply passes on the values of FUN# and REG# to TRANS BLOCK 172 to be sent onto secondary PCI bus 96.

If the value of BUS# is greater than the value of BUS_NO 160, but less than or equal to SUB_BUS_NO 162, then the present configuration cycle is intended for a peripheral device or PCI bridge attached to a PCI bus that is lower in the hierarchy of the PCI network than secondary PCI bus 96. In this situation, comparator 190 will enable line 206 which enables logic block 194.

Additionally, when this particular situation occurs, decoder 196 is not activated. Thus, it simply passes the present values of all of the fields of CONFIG_AD 150, including the "01" value of bit number 0 and 1, to TRANS BLOCK 172.

When logic block 194 is activated by lines 204 or 206, it enables EXT_CYC 184, which signals to TRANS BLOCK 172 that the present configuration cycle is targeted to a device or PCI bridge external to PCI bridge 80. Accordingly, TRANS BLOCK 172 will transfer the values of the fields of CONFIG_AD 150 it receives on line 186 from CONFIG BLOCK 152 out onto secondary PCI bus 96.

If the configuration cycle is targeted for a device or PCI bridge on secondary PCI bus 96, the decoded value of DEV# enables the appropriate device or bridge and, because bit numbers 0 and 1 are set to "00", an internal configuration cycle is performed on a register in the configuration space of that particular device. The register is identified by REG#. The control signals on secondary PCI bus 96 from CPU 24 will determine whether the configuration cycle is a read or write operation.

If the configuration cycle is targeted for a device or PCI bridge that is connected to a PCI bus beneath bus 96 in the hierarchy of the PCI network, then CONFIG_AD 150 is simply passed along to the PCI bridges behind bus 96, which will each perform the BUS# comparison procedure described above until a bridge is located that has a BUS_NO equal to BUS#. Then this particular PCI bridge will decode the DEV# and the configuration cycle will be performed in the configuration space of the targeted device attached to the bus on the secondary side of that bridge.

Thus, the hardware of each PCI bridge in a PCI network is standardized and does not change from bridge to bridge. In addition, the hardwired logic that comprises each bridge is known.

PCI HOST BRIDGE HARDWARE

Figure 4B:
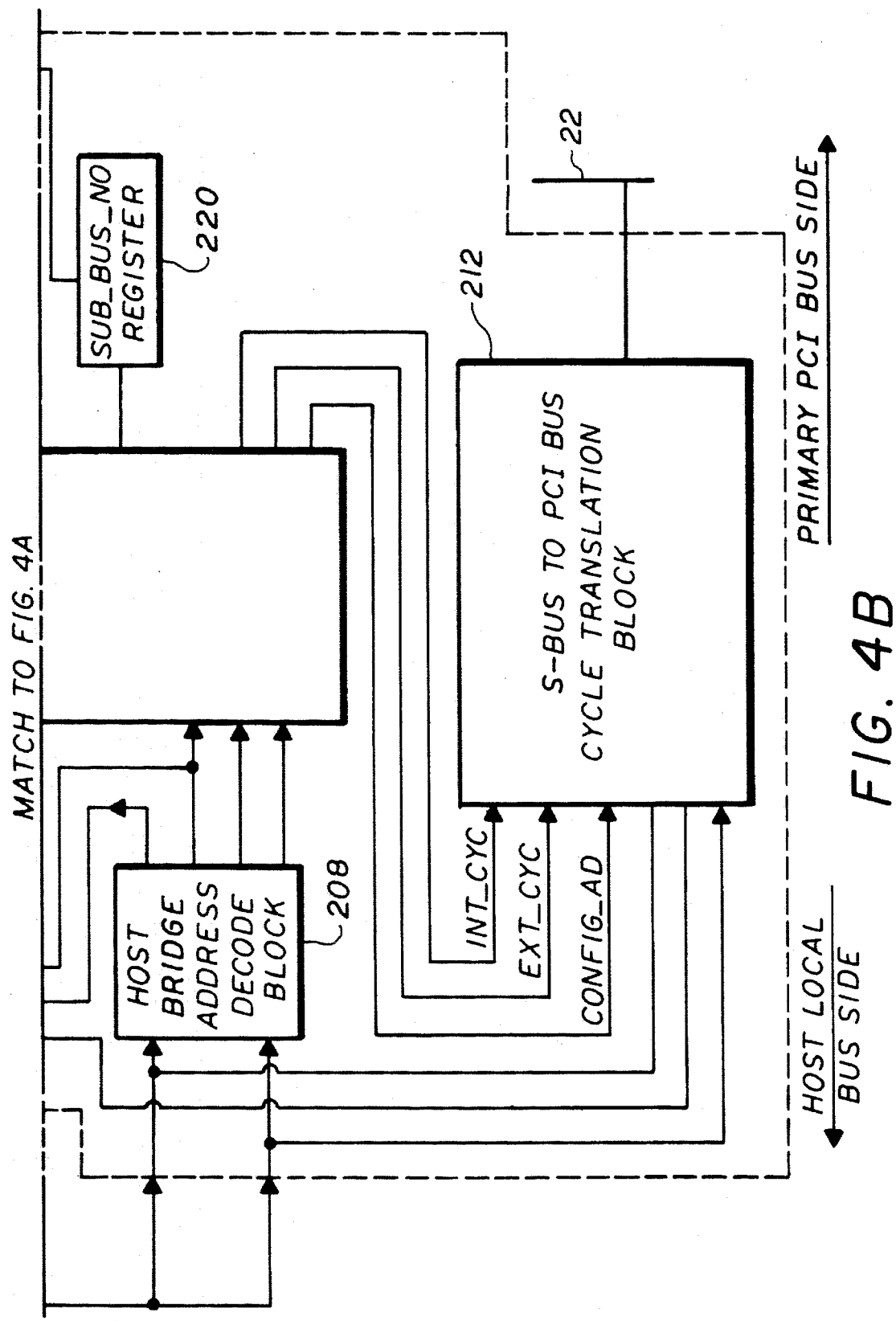

Referring now to FIGS. 4A–4B, a block diagram of the hardware used for configuration of host bridge 20 is shown. As FIGS. 4A–4B illustrates, the configuration hardware of host bridge 20 is substantially similar to the configuration hardware of PCI bridge 80, depicted in FIGS. 2A–2B. Indeed, host bridge 20 has a DECODE BLOCK 208, a CONFIG BLOCK 210, and a TRANS BLOCK 212. It also has the following registers: a CONFIG_AD register 214, a DEV_ATTR register 216, a BUS_NO register 218 and a SUB_BUS_NO register 220. The function of these components of host bridge 20 are substantially the same as their respective counterparts in PCI bridge 80.

The only hardware differences between host bridge 20 and PCI bridge 80, are that host bridge 20 includes some additional hardware to accommodate an information handling system 10 that has a plurality of host bridges and PCI networks. This additional hardware includes a configuration enable register (CONFIG_ENBL) 222, which is connected by enable output (ENBL_OUT) 224 to s-bus 16. An additional output line 226 runs from DECODE BLOCK 208 to CONFIG_ENBL 222 to provide read and write signals to CONFIG_ENBL 222. An and gate 228 is also provided with an input from the most significant bit of CONFIG_AD 214 and another input from s-bus 16 called EXT_ENBL 232. And gate 228 also has an output line 234.

CONFIG BLOCK 210 also has one small difference when compared to CONFIG BLOCK 152. The AND1 gate of CONFIG BLOCK 210 (not shown) receives two of its inputs from DEV# and the comparator of CONFIG BLOCK 210 instead of from bit numbers 0 and 1 of CONFIG_AD as in CONFIG BLOCK 152. Accordingly, the AND1 of CONFIG BLOCK 210 only allows a configuration cycle to the internal registers of host bridge 20 when BUS# and DEV# are equal to 0. If DEV# is greater than 0 and BUS# is equal to 0, then the configuration cycle is directed by CONFIG BLOCK 210 to a device attached to the PCI bus connected to the secondary side of the host bridge.

The CONFIG_ENBL 222 is a 32-bit register that has, in a multiple host bridge system, each individual bit attached to the EXT_ENBL 232 of a different host bridge. Accordingly, when a configuration cycle is directed to the internal registers of a particular host bridge, only one bit of CONFIG_ENBL will be high and that bit will be attached to the EXT_ENBL of the host bridge to which the configuration cycle is directed.

In operation, the CPU 24 will cause DECODE BLOCK 208 to generate a write command on line 226 to CONFIG_ENBL 222 and a value provided by CPU 24 on s-bus 16 will be written into CONFIG_ENBL 222. This 32-bit value will have only one bit high and the rest low.

The CPU 24 will then cause DECODE BLOCK 208 to send a signal on line 226 that causes CONFIG_ENBL 222 to transmit the 32-bit value onto s-bus 16 through ENBL_OUT 224. Then the host bridge that has its EXT_ENBL connected to the bit in the 32-bit signal having a high value will be activated for the present configuration cycle.

Assuming that EXT_ENBL 232 is activated by the high bit number in ENBL_OUT 224, if the most significant bit of CONFIG_AD 214 is high as set by the CPU 24, then and gate 228 will generate an enable signal on line 234. This will cause CONFIG_BLOCK 210 to perform a configuration cycle on the internal registers of host bridge 20, assuming that both DEV# and BUS# are equal to 0. If the bit number of CONFIG_ENBL 222 that is set to a high, is attached to the EXT_ENBL of a different host bridge, then that particular bridge will be activated for an internal configuration cycle.

All of the PCI host bridges in an information handling system may be comprised of the same hardware. Only one of the host bridges, however, needs to have a CONFIG_ENBL register. Thus, to preserve the standardization of host bridges in a system, each bridge may be manufactured with a CONFIG_ENBL register, but the register would only be connected and used in one host bridge per system. Also, the CONFIG_ENBL register could be external to the host bridges if desired.

METHOD FOR CREATION OF PRELIMINARY MAP

Accordingly, as the above explanation of configuration space access indicates, the preliminary map that is used in the preferred embodiment to access the configuration spaces of the various bridges and devices that comprise the PCI network are the values of BUS_NO and SUB_BUS_NO. Previously, no method or apparatus existed that would provide the correct values for BUS_NO and SUB_BUS_NO, when the physical configuration of the PCI network changed, without reprogramming the configuration software of the entire system. The inventive software program described below, however, will provide correct values for BUS_NO and SUB_BUS_NO for each bridge in the PCI network without any reprogramming, even if the physical configuration of the PCI network changes dramatically between shut-down and start-up of system 10.

This program is stored in system memory 32 and is accessed and run by CPU 24 during configuration of the system, before any other configuration cycles begin to run. The program causes several read and write cycles to be executed on the internal configuration registers, BUS_NO and SUB_BUS_NO, of the PCI bridges and host bridges in the system.

Figure 5A:
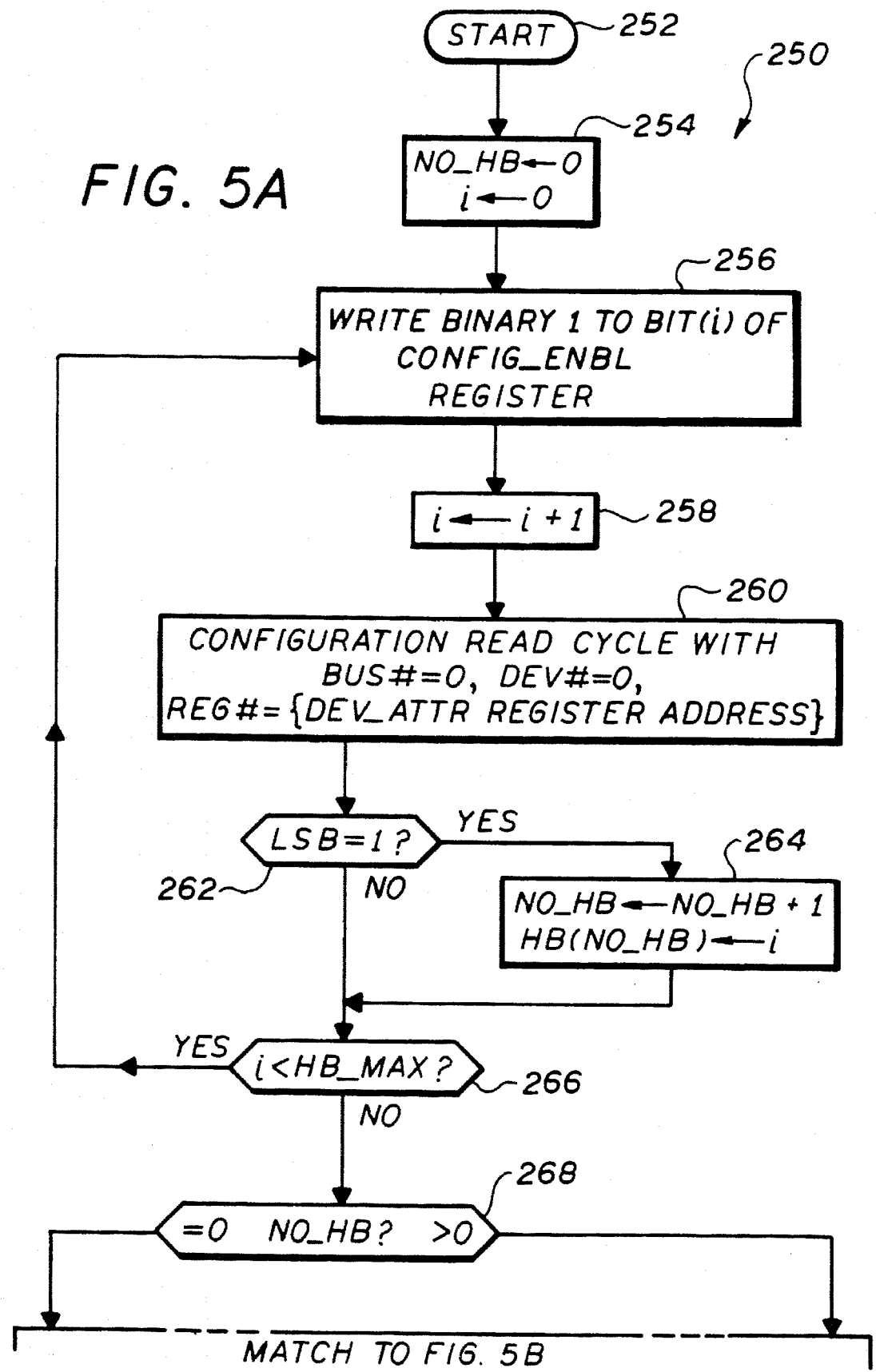
FIGS. 5A through 5C, are a flow chart of a software program used to provide a preliminary map of a multiple bus network.
Figure 5B:
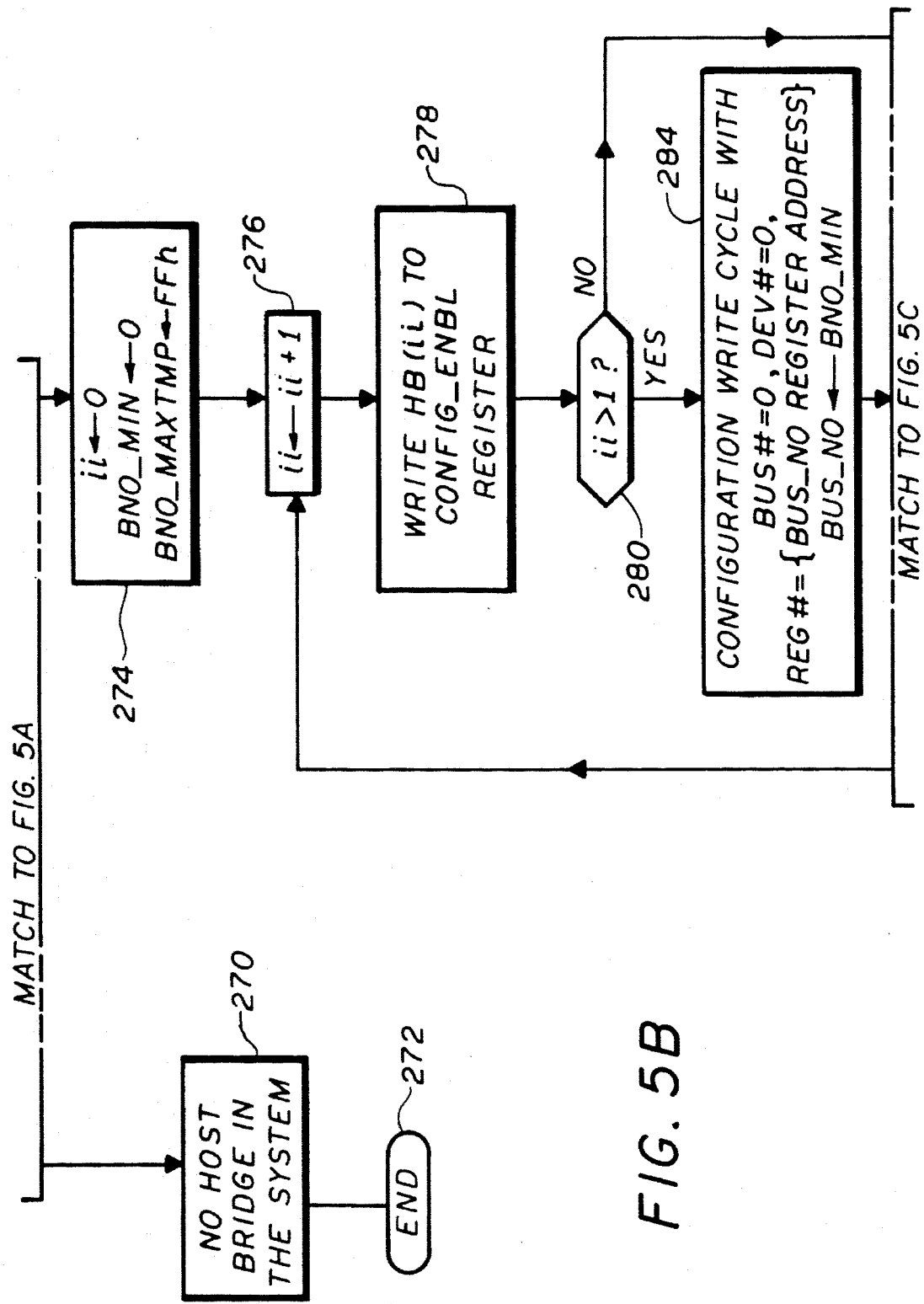
Figure 5C:
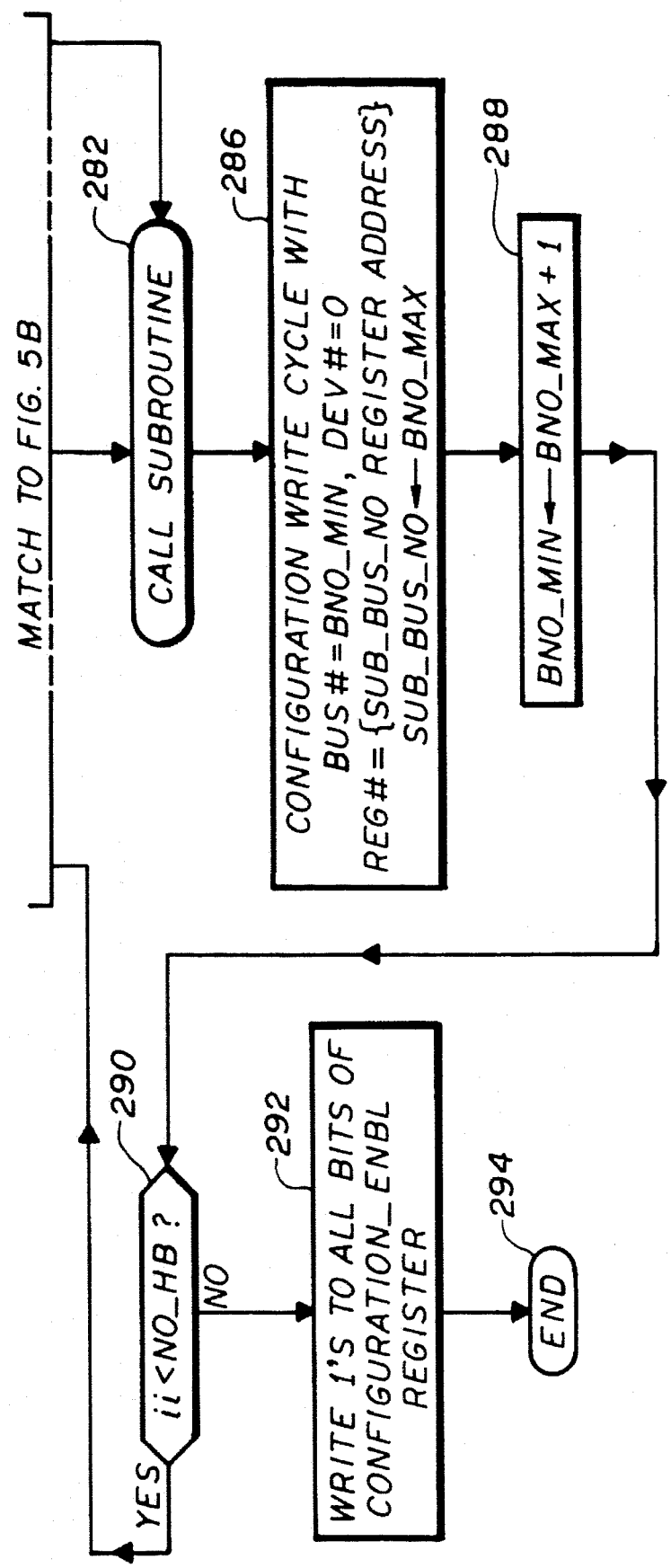
Figure 6A:
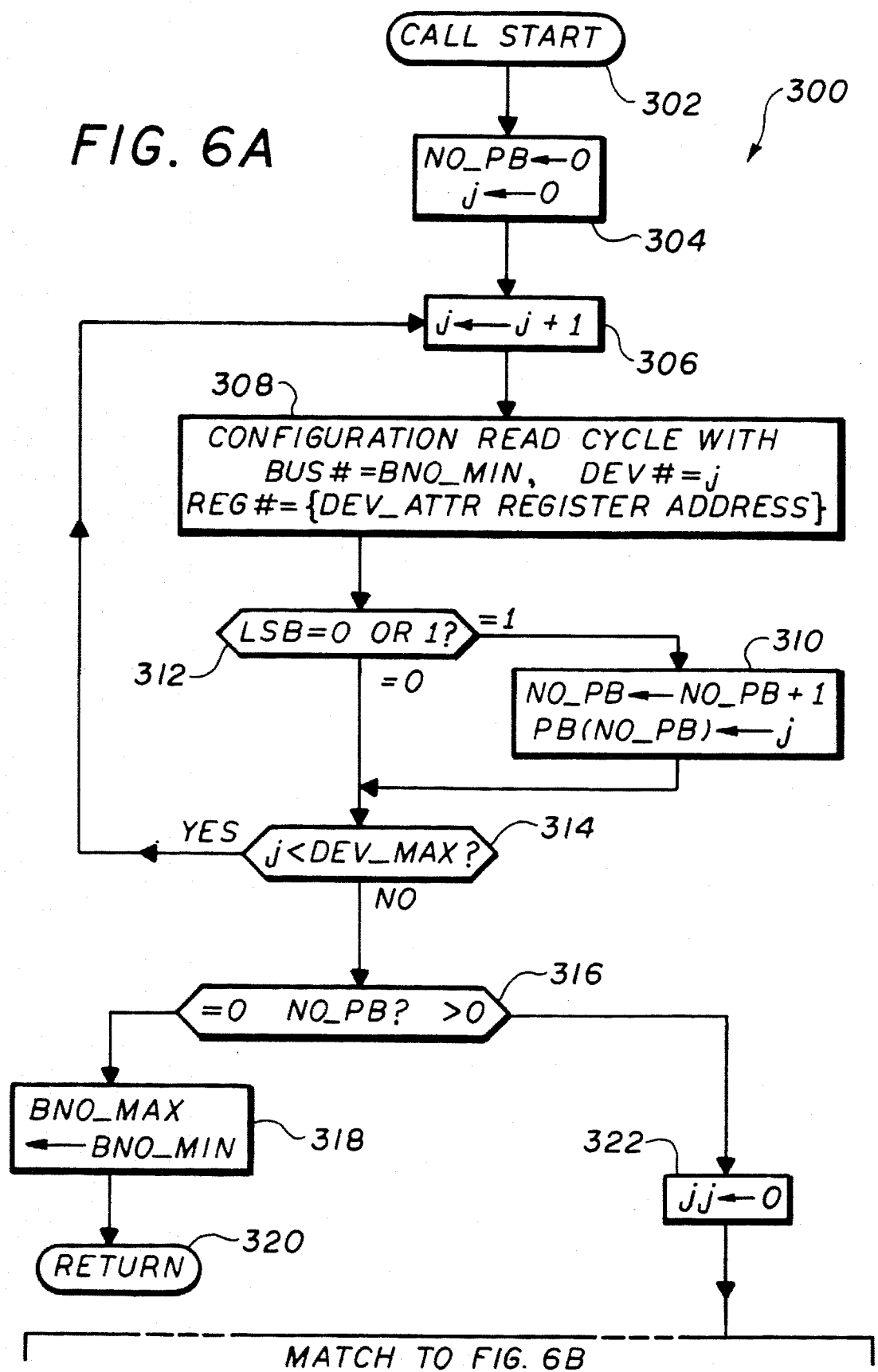
Figure 6B:
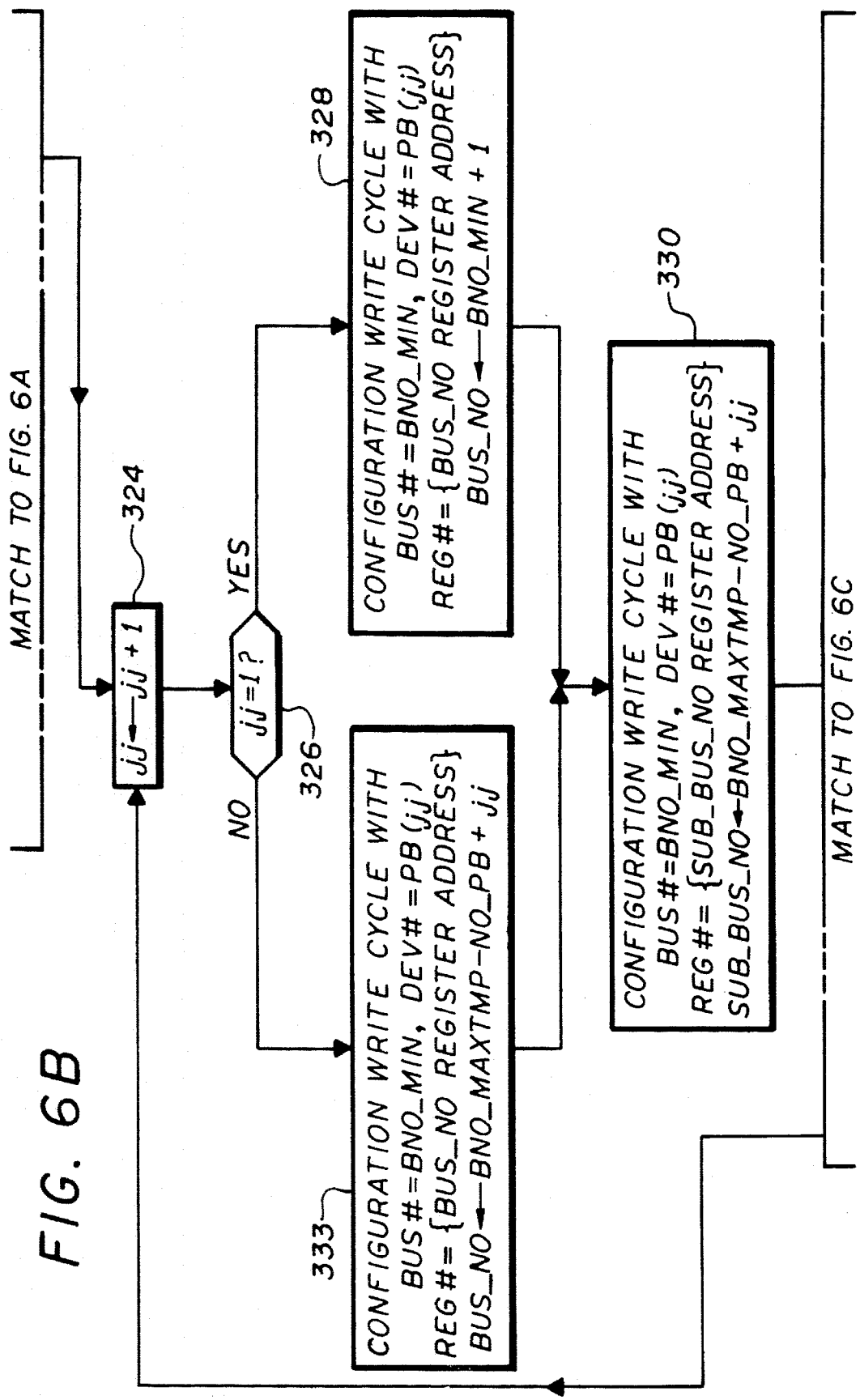
Figure 6D:
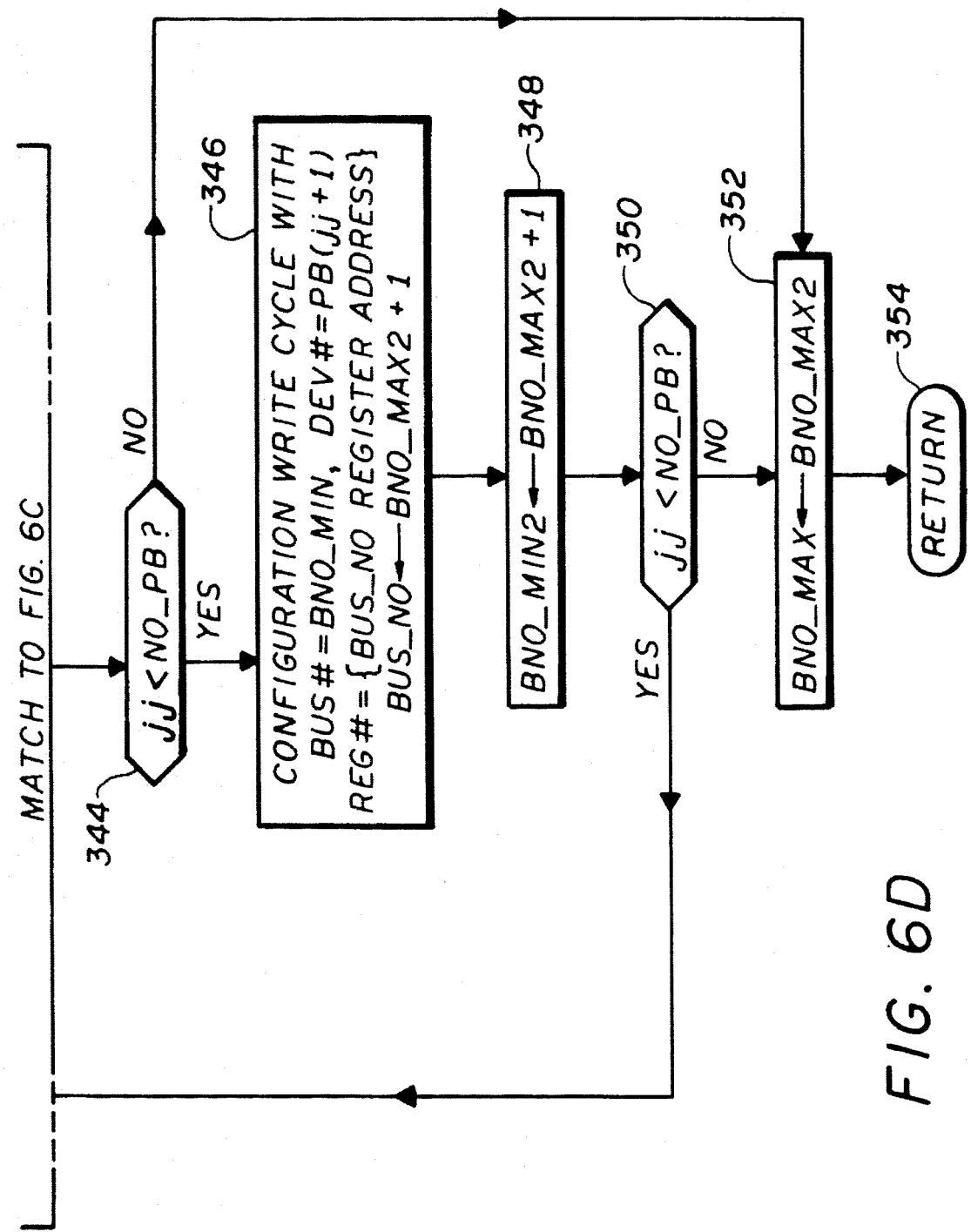

The program can be divided into two main decision and action paths (flow paths). The first flow path is the main flow path of the program and is shown in FIGS. 5A–5C. This main flow path has the capability to map the bus numbers and sub-bus numbers of information handling systems that have a plurality of host bridges, and thus, a plurality of PCI networks.

The second flow path is for a subroutine that is called by the main flow path for each host bridge and which is then called repeatedly by itself for each bus in the PCI network. Accordingly, since the subroutine calls itself repeatedly, it is referred to herein as a "recursive" subroutine. FIGS. 6A–6D depicts the recursive subroutine. The main functions of the recursive subroutine are to count the PCI bridges attached to each bus, to set temporary values for the BUS_NO and SUB_BUS_NO of each PCI bridge as it moves down through the levels of the hierarchy that comprise a PCI network by recalling itself for each PCI bus, and to set permanent values for the BUS_NO and SUB_BUS_NO of each PCI bridge once the subroutine returns from a call to it for a bus attached to a particular bridge.

Referring now specifically to FIGS. 5A–5C, a main flow path of a preliminary mapping program 250 is shown. Two pointers or counters are referred to throughout the flow path. These pointers are indicated by the variables i and ii. A constant, HB_MAX, is also used, which indicates the maximum number of host bridges that may be present in a computer system. HB_MAX is set by the limitations of the CPU 24 or the system designer. Flow path 250 uses a memory array HB for recording the bit numbers of CONFIG_ENBL assigned to each bridge. For example, HB(1) records the bit number of CONFIG_ENBL that will enable host bridge No. 1, the first host bridge in the system.

The main flow path 250 has a start 252 which begins the program when it is called by the CPU 24 upon start-up or initialization of the system. The BUS_NO values of all host bridges are set to 00 as a default upon start-up of the computer system. Start 252 then proceeds to an action step 254 in which the pointer i and a variable NO_HB are set to 0. The variable NO_HB is the number of host bridges in the system as they are counted by flow path 250.

Flow path 250 then proceeds to an action step 256 in which a 32-bit value is written into the CONFIG_ENBL register having only one bit number that is high, and this bit number is identified by the pointer i. Thus, for example, in the first iteration of flow path 250, bit number 0 of CONFIG_ENBL will be high and the rest of the bits of this register will be low. Then, i is incremented in an action step 258.

The next step in flow path 250 is an action step 260 which conducts a read configuration cycle to a DEV_ATTR register with the fields of CONFIG_AD 214 set to BUS#=0, DEV#=0. Continuing with the example set forth immediately above, if the EXT_ENBL input of a host bridge is attached to bit number 0 of CONFIG_ENBL 222, action step 260 will cause the CPU to read the contents of the DEV_ATTR register of that host bridge. This is because all host bridges respond to a configuration cycle when the values of BUS# and DEV# are equal to 0. The only way to enable the host bridges individually for a configuration cycle is by their different EXT_ENBL inputs from CONFIG_ENBL 222.

Decision step 262 is the next step in flow path 250. Decision step 262 evaluates whether the least significant bit of the DEV_ATTR register has a high value. If this is true, then a host bridge is attached to bit number 0 of the CONFIG_ENBL 222 and decision step 262 transfers to an action step 264 in which NO_HB is incremented by one to count the number of host bridges in the system and the bit number of CONFIG_ENBL 222 which activated the host bridge, bit number 0, is stored in the memory array with the variable set to HB(i) or HB(1).

If no host bridge is attached to bit number 0 then no device responds to the configuration read cycle, and thus, the CPU judges the LSB of the DEV_ATTR register of the non-responding host bridge to be 0. Accordingly, NO_HB is not incremented and no host bus is counted.

After decision step 262 and action step 264, flow path 250 goes to another decision step 266, which compares i with HB_MAX. If i is less than HB_MAX, then flow path 250 loops back to action step 256 which writes a new value to CONFIG_ENBL 222 having the next bit number, equal to an incremented i, high and the other bit numbers equal to 0. This looping continues until i is equal to HB_MAX meaning that all host bridges that could possibly be in information handling system 10 have been located and counted. Accordingly, NO_HB will equal the total number of host bridges in the system and the HB array will indicate the values of CONFIG_ENBL that must be generated by the CPU 24 to access each host bridge's configuration space. When this is true, then decision step 266 goes onto another decision step 268.

At decision step 268, NO_HB is compared with 0. If NO_HB is equal to 0, then the CPU 24 judges at an action block 270 that there are no host bridges in information handling system 10, and thus, that a preliminary map of BUS_NO and SUB_BUS_NO registers is not required for configuration. Accordingly, the program stops at an end 272.

If NO_HB is greater than 0, then there is at least one host bridge in the computer system and at least one PCI network for which a preliminary map of BUS_NO and SUB_BUS_NO must be generated. Accordingly, the flow path 250 will continue from decision step 268 to an action step 274.

Action step 274 introduces two new variables to flow path 250, BNO_MIN and BNO_MAXTMP. BNO_MIN is the minimum value for BUS_NO that increases through flow path 250 as the number of buses located in the PCI network increase. BNO_MAXTMP is the temporary value that flow path 250 sets for the SUB_BUS_NO of each PCI bridge which decreases as the number of buses located in the PCI network increases. Action step 274 sets the initial values of pointer ii to 0, BNO_MIN to 00 and BNO_MAXTMP to FF hexadecimal.

Flow path 250 moves on to an action step 276 which increments pointer ii by one and then moves on to another action step 278. A write configuration cycle is performed to the CONFIG_ENBL register 222 by action step 278. The value written to CONFIG_ENBL 222 in this Step is from the HB(NO_HB) array with (NO_HB) having the value of ii. Thus, if the value of ii is 1, the array value for host bridge NO. 1, which is the value that will enable the EXT_ENBL 232 of host bridge NO. 1, is written into CONFIG_ENBL 222. This will allow configuration read and write cycles to be performed to the internal registers of host bridge NO. 1 as flow path 250 progresses, specifically the BUS_NO and SUB_BUS_NO registers of host bridge NO. 1.

A decision step 280 is the next step in flow path 250. Decision step 280 determines whether ii is greater than 1, and if not, then it loops to a call block 282 skipping an action block 284. Call block 282 calls a recursive subroutine 300, which is shown in FIGS. 6A–6D. Thus, for the first call of subroutine 300, when ii is equal to 1, meaning that the preliminary map for the PCI network behind the first host bridge in the computer system is being generated, flow path 250 skips action block 284.

For the purpose of understanding flow path 250, only the value of BNO_MAX returned to flow path 250 by the call of subroutine 300 need be discussed. If the BUS_NO register of the host bridge that corresponds to ii has the value x and the total number of PCI buses in the PCI network behind that host bridge is z, then the value for BNO_MAX returned by subroutine 300 is x+z−1. The method by which subroutine 300 derives this value is discussed in detail below.

Therefore, assuming that this is the first call of subroutine 300 for the first host bridge in the computer system, BNO_MIN equals 0 by default; and assuming, for example there are a total of 4 PCI buses in the PCI network behind the first host bridge, the value returned by subroutine 300 for BNO_MAX will be 3. This means that the BUS_NO register of the host bridge and the bus immediately behind it were assigned the value of 0 (which the host bridge had as a default value), and the BUS_NO registers of the 3 PCI bridges behind that host bridge and the PCI buses behind them were assigned the values 1 through 3, respectively, by subroutine 300.

After call block 282 returns with the value for BNO_MAX, flow path goes onto an action step 286 in which a configuration write cycle is conducted to the SUB_BUS_NO register of the present host bridge as indicated by ii. The value written into the SUB_BUS_NO is BNO_MAX.

Accordingly, continuing with the example discussed in the immediately preceding paragraph, the value 3 will be written into the SUB_BUS_NO of the first host bridge in the system. Thus, the values of the BUS_NO and SUB_BUS_NO registers for the first host bridge in the system will be 0 and 3, respectively. The host bridge will now only respond to configuration cycles in which the BUS# field is equal to 0 through 3, which are the identification numbers assigned to the respective PCI buses in the PCI network behind the host bridge.

The next step in flow path 250 is an action step 288 which derives a new value for BNO_MIN by adding 1 to BNO_MAX. This new BNO_MIN will be the BUS_NO of the next host bridge in the computer system, if one exists, and the number assigned to the bus immediately behind that host bridge.

The next step in flow path 250, a decision step 290, performs the function of determining whether there are any more host bridges in the system by comparing ii to NO_HB. If NO_HB exceeds ii then, there are more host bridges in the system and decision step 290 loops back to action block 276 in which ii is incremented. If this occurs, then BNO_MIN is written into the BUS_NO register of the next host bridge in the system by action block 284. Then subroutine 300 is called and the whole procedure repeats itself.

The procedure repeats for each host bridge until ii is equal to NO_HB, then decision step 290 proceeds to action step 292, in which all bits of CONFIG_ENBL 222 are set to high for the remainder of the configuration procedures to be performed by the configuration software of the computer system. This allows the configuration software to access the configuration spaces of all host bridges if needed.

The program then ends at block 294. At this time, a complete preliminary map of all PCI networks in the system will have been created based on the BUS_NO and SUB_BUS_NO registers of all bridges in the system. If the physical configuration of the PCI networks should change, the preliminary map can be changed simply by re-initializing the computer system without any reprogramming.

Referring specifically now to FIGS. 6A–6D, the flow path of subroutine 300 is shown. Subroutine 300 has two pointers, j and jj. DEV_MAX is a constant used by subroutine 300, which is the maximum number of peripheral devices or PCI bridges that can be connected to one PCI bus. As set forth above, the DEV_MAX of the preferred embodiment is twenty-one (21).

Subroutine 300 also uses several variables, including BNO_MIN, BNO_MAXTMP, and BNO_MAX. As set forth above, the values for BNO_MIN and BNO_MAXTMP are set by the main flow path 250 before it calls subroutine 300. The initial values of these variables, as set forth above, are 00 and FF, respectively. BNO_MAX is the variable that subroutine 300 returns to flow path 250.

Another variable used by subroutine 300 is NO_PB. NO_PB is the number of PCI bridges connected to a particular PCI bus.

When it is called by flow path 250, subroutine 300 begins at start 302 and proceeds to action step 304 in which NO_PB and j are set to 0. Subroutine 300 then proceeds to action step 306 in which j is incremented by 1.

Subroutine 300 then begins its first main procedure which is to count the PCI bridges attached to the bus for which the subroutine was called. The steps that accomplish this task are action steps 308 and 310 and decision steps 312 and 314.

Action step 308 begins by performing a configuration read cycle to DEV_ATTR with BUS# equal to BNO_MIN and the DEV# field equal to j, which on the first iteration of the counting procedure is 1. Decision step 312 then determines if the LSB of DEV_ATTR is a 0 or 1. If the LSB is a 1, then the device responding to the read is a PCI bridge, and the subroutine 300 branches off to action step 310 which increments NO_PB to count the number of PCI bridges attached to the PCI bus and creates a PB array by inserting j into the value for PB(NO_PB). This array when completed will indicate the various DEV# values that will activate each PCI bridge to access their internal configuration spaces. This array is similar to the HB array in flow path 250.

If the LSB of DEV_ATTR is a 0, this means that there is a device that is activated by the DEV# having the value j, but it is a regular PCI device and not a PCI bridge. In this case, the CPU 24 notes that a device is activated by that particular DEV#, but does not increment NO_PB. Instead the subroutine proceeds to decision step 314. If there is no peripheral device or PCI bridge that is activated by DEV# equal to j, the CPU 24 also notes this information and proceeds to decision step 314.

Decision step 314 compares j with DEV_MAX. If j is less than DEV_MAX, then subroutine 300 loops back to action step 306 in which j is incremented. Accordingly, this loop will repeat until the value of j is equal to DEV_MAX.

When this occurs, NO_PB will be equal to the number of PCI bridges attached to the particular PCI bus for which the call to subroutine 300 was initiated (the calling PCI bus). Also, the PB array will be complete, and a chart will have been created in system memory 32 by CPU 24 that is similar to the following:

| BUS# | DEV# | Device |
|---|---|---|
| 0 | 0 | HOST Bridge |
| 0 | 1 | PCI Device |
| 0 | 2 | (nothing) |
| 0 | 3 | PCI Bridge |
| 0 | 4 | PCI Bridge |
| ⋮ | ⋮ | ⋮ |
| 0 | 21 | : |

Subroutine then proceeds to a decision step 316 which determines if there are any PCI bridges attached to the calling PCI bus. NO_PB is compared to 0 in decision step 316 and, if NO_PB is equal to 0, then there are no PCI bridges. If this is the case, then subroutine 300 goes to action step 318 which transfers the value of BNO_MIN into BNO_MAX. Subroutine 300 then returns to the main flow path 250 in a return block 320. If NO_PB is greater than 0, then at least one PCI bridge is connected to the calling PCI bus, and subroutine 300 proceeds from decision step 316 to an action step 322.

Action step 322 is the beginning of a looping sequence in subroutine 300 in which temporary values are set in the BUS_NO and SUB_BUS_NO registers of the PCI bridges attached to the calling bus. Action step 322 sets jj to 0 and then proceeds to an action step 324, which increments jj by 1.

The next step in subroutine 300 is a decision step 326, in which a determination is made whether jj is equal to 1. If jj is indeed 1, then this is the first iteration through this looping sequence, and the subroutine 300 proceeds to action step 328. Action step 328 performs a write configuration cycle with BUS#=BNO_MIN, DEV#=PB(jj), and REG#=BUS_NO. The value written in this configuration cycle is BNO_MIN+1. The result of this write configuration cycle is that the BUS_NO value of the first PCI bridge attached to the calling bus is set at BNO_MIN+1. For example, if this is the first call of subroutine 300 for a bus directly behind a PCI host bridge, this BUS_NO value will be 1. Subroutine 300 then proceeds to an action step 330.

If decision step 326 determines that jj is not equal to one, then this is not the first iteration through the looping procedure and decision step 326 proceeds to an action step 333. Action step 333 causes a write to the BUS_NO address of a PCI bridge on the calling bus with DEV#=PB(jj). The value written into the BUS_NO is BNO_MAXTMP−NO_PB+jj. This value is a temporary value for BUS_NO while the subroutine 300 moves down through the PCI network to the bottom level of the PCI hierarchy. Action step 333 then goes to action step 330.

Action step 330 performs a configuration write cycle to a SUB_BUS_NO of the PCI bridge attached to the calling bus that responds when DEV#=PB(jj). The value written into SUB_BUS_NO is a temporary value equal to BNO_MAXTMP_NO−PB+jj.

Subroutine 300 then proceeds to a decision step 332, which causes the subroutine 300 to loop back to action step 324 until jj is equal to NO_PB. When this is true then a table of temporary values for each PCI bridge will have been created similar to the table shown below:

| Bridge No. | BUS_NO | SUB_BUS_NO |
| --- | --- | --- |
| 1 | BNO_MIN + 1 | BNO_MAXTMP – NO_PB + 1 |
| : | : | : |
| jj | BNO_MAXTMP – NO_PB + jj | BNO_MAXTMP – NO_PB + jj |
| : | : | : |
| NO_PB | BNO_MAXTMP | BNO_MAXTMP |

The PCI buses attached to the secondary sides of the bridges in this table represent the second layer of the hierarchy of the PCI network. The PCI buses attached to the host bridges in the system represent the first layer of the hierarchy.

Subroutine 300 then moves to action step 334, which begins the recursive portion of the subroutine. Action step 334 sets counter jj to 0 and sets the value of a new variable, BNO_MIN2, to BNO_MIN+1.

The next step is an action step 336 in which jj is incremented by 1. Action step 336 is followed by another action step 338 in which a new variable, BNO_MAXTMP2, is introduced. Action step 338 gives BNO_MAXTMP2 the value of BNO_MAXTMP–NO_PB+jj.

Subroutine 300 then moves on to a call block 340 in which subroutine 300 calls itself to count the PCI bridges attached to the second layer of PCI buses in the PCI hierarchy. The number of PCI bridges attached to this second layer of buses will indicate the number of PCI buses in the third layer of the PCI hierarchy.

During this second call of subroutine 300 at call block 340, the variables used in place of BNO_MIN and BNO_MAXTMP are BNO_MIN2 and BNO_MAXTMP2, respectively. Similarly, the return value from this second call will be a variable BNO_MAX2 instead of BNO_MAX. If x equals the number of PCI bridges, and thus, PCI buses behind the PCI bridge identified as PB(jj), then the return value of BNO_MAX2 will be BNO_MIN2+x−1. BNO_MAX2 is the reference number of the PCI bus with the highest reference number behind the particular PCI bus, PB(jj).

When call block 340 returns a value for BNO_MAX2, subroutine 300 moves on to an action block 342. Action block 342 causes a configuration write cycle to be executed to a SUB_BUS_NO register with BUS#=BNO_MIN, DEV#=PB(jj) and the information to be written equal to BNO_MAX2.

If jj is equal to 1, then this causes BNO_MAX2 to be written over the temporary value set in the SUB_BUS_NO of PB(1), the bridge with reference number 1 in the table set forth above. The BUS_NO of PB(1) will already have been set to BNO_MIN+1 or 1 in action block 328. Thus, the BUS_NO and SUB_BUS_NO registers of PB(1) provide the range of the reference numbers assigned to all PCI buses behind PB(1).

Subroutine 300 then moves on to a decision step 344 in which jj is compared with NO_PB. If jj is less than NO_PB, then subroutine 300 continues to an action step 346 in which a configuration write cycle is performed to the BUS_NO register of PB(jj+1). The value written is BNO_MAX2+1. Accordingly, if jj is equal to 1, then the bridge directly behind PB(2), or the second bus in the table set forth above, is assigned the reference value of BNO_MAX2+1. This value is one increment beyond the range of PCI buses set in the BUS_NO and SUB_BUS_NO registers of PB(1). This same value becomes the new value for BNO_MIN2 in a next action step 348.

Subroutine 300 next proceeds to another decision step 350 in which jj is again compared to NO_PB. If jj is less then NO_PB, which it inevitably will be, then subroutine 300 loops back up to action step 336.

Action step 336 then increments jj by 1, and subroutine 300 calls itself again to count the PCI buses behind the next PCI bridge, PB(jj). This call of subroutine 300 will return a BNO_MAX2 value for PB(jj).

Until jj is equal to NO_PB, subroutine 300 will continue to call itself for each value of jj. When jj does equal NO_PB, decision step 344 causes subroutine 300 to loop to an action step 352. This means that all of the PCI buses behind a particular host bridge identified by HB(ii) will have been counted.

The value of BNO_MAX2 is copied into BNO_MAX in action step 352. Then in a return step 354, subroutine 300 returns to flow path 250 at call block 282 with BNO_MAX.

Subroutine 300 will recursively call itself for each hierarchical layer of PCI buses behind each bridge in the PCI network until it reaches the "bottom" of the hierarchy. Subroutine 300 must use a different memory register in system memory 32 for the pointers and variables for each call of subroutine 300, or the software program will not return correct values. For instance, if subroutine 300 calls itself three times for one NO_PB(jj), one memory location must be used for the jj pointer of each call. Thus, there must be three memory locations set aside for the three different jj pointers.

Similarly, different memory locations must be set aside for the variables BNO_MAX, BNO_MIN, PB_NO and BNOMAX_TMP of each layer. For example, the BNO_MAX of the third call of subroutine 300 must have its own memory location BNO_MAX3; the fourth call, BNO_MAX4; . . . and; the y call, BNO_MAXy. The variables BNO_MAXy and BNO_MINy are actually the same variable that is incremented by one for each PCI bus in the PCI network.

Referring now to FIG. 7, the block diagram of a possible physical configuration of a PCI network is shown. Each block in FIG. 7 is a PCI bridge or host bridge.

There are 3 host bridges, A, B and C in FIG. 7. Host bridge A has three PCI bridges attached in a hierarchy behind it. Two of these PCI bridges, A1 and A2, are attached as peers to a PCI bus A, which is attached directly behind host bridge A. A PCI bridge B1 is then attached to a PCI bus B which is attached to the secondary side of bridge A1. Bridges B1 and A2 have PCI buses C and D, respectively, attached to their secondary sides.

Host bridge B only has a PCI bus E attached to its secondary side. Host bridge C has a PCI bus F connected to its secondary side, which has a PCI bridge F1 attached to it. PCI bridge F1 then has a PCI bus G attached to its secondary side.

Each of the bridges in FIG. 7 have two blocks in them with a number contained in each block. The top block represents the BUS_NO register of that particular bridge and the bottom block represents the SUB_BUS_NO register. The numbers in these blocks represent the values assigned to the registers by flow path 250 and subroutine 300 described in FIGS. 5A–5C and 6A–6D.

Upon start-up or initialization of the computer system the values shown in FIG. 7 are assigned by the operation of flow path 250 and subroutine 300 as follows:

Referring now to FIGS. 5A–5C, 6A–6D and 7, flow path 250 is called by CPU 24 before any other configuration software for the system is activated. Flow path 250 begins by driving each bit of CONFIG_ENBL to a high individually. A specific bit in CONFIG_ENBL will activate each of the host bridges A, B and C for a read cycle to their DEV_ATTR registers and the LSB of each of those registers will be counted by incrementing NO_HB in action step 264. Step 264 also generates the array of the bit numbers of CONFIG_ENBL that activate each bridge.

Accordingly, when decision step 268 is reached, NO_HB is equal to 3 or the number of host bridges in FIG. 7. Then action block 278 writes to CONFIG_ENBL a high signal at the bit number that activates host bridge A for internal configuration cycles. The first call to subroutine 300 is then made at block 282.

Subroutine 300 begins by counting PCI bridges A1 and A2, by reading the DEV_ATTR registers of each device or PCI bridge attached to PCI bus A. This is accomplished by the loop procedure between blocks 306 and 314.

Accordingly, when j=21 (the DEV_MAX) in decision block 314, the value of NO_PB will be equal to two and the PB array will have been created. The PB array will indicate which bit numbers of the CONFIG_AD of host bridge A will activate PCI bridges A1 and A2 for a configuration cycle.

Next, in the looping procedure set forth in blocks 324 through 332, temporary values are set for the SUB_BUS_NO and BUS_NO registers of bridges A1 and A2, except that the BUS_NO of bridge A1 is permanently set to 1.

The recursive subroutine procedure shown in FIGS. 6A–6D is then implemented for bridge A1. Block 340 causes subroutine 300 to call itself. Accordingly, the counting and array creating procedure between blocks 306 and 314 is implemented to count the PCI bridges attached to PCI bus B. At the end of this procedure, NO_PB2 will be equal to 1, for PCI bridge B1, and the array of PB2 will have been created.

The looping procedure between block numbers 324 and 332 then sets a temporary value for the SUB_BUS_NO of PCI bridge B1 and sets its BUS_NO to the permanent value of 2 in block 328.

Block 340 then once again calls subroutine 300 for PCI bridge B1. This is the third layer of calls to subroutine 300.

This time the subroutine 300 attempts to count the number of bridges on PCI bus C and finds that there are none, so NO_PB=0. Thus, block 318 returns to the second layer of calls to subroutine 300 with BNO_MAX3 equal to 2. BNO_MAX3, or 2, is then permanently written into the SUB_BUS_NO of bridge B1 in action step 342.

Since there are no other bridges attached to PCI bus B, jj is equal to NO_PB at decision step 344 and subroutine 300 loops down to action block 352. BNO_MAX3, or 2, is copied into BNO_MAX2 at decision step 352 and a return is made at block 354 to the first layer of calls to subroutine 300.

The value 2 is then copied into the SUB_BUS_NO register of bridge A1 at block 342. Next the value 3 is copied into the BUS_NO of PCI bridge A2 at action block 346.

Since this is the first iteration through FIGS. 6A–6D and NO_PB is equal to 2, subroutine 300 loops back up to block 336. Then, another second layer call to subroutine 300 is made for PCI bridge A2. This call returns to the first layer indicating that there are no PCI bridges attached to PCI bus D. Accordingly the BNO_MAX2 returned for that call is 3. This value is then copied into the SUB_BUS_NO of PCI bridge A2 at block 342.

The value of jj is now equal to NO_PB. Thus, decision step 344 loops down to block 352 in which BNO_MAX is given the value of BNO_MAX2 or 3. Then a return is made to main flow path 250 at block 282.

The value of 3 is then written into the SUB_BUS_NO of host bridge A at block 286. BNO_MIN is then set to equal 4 in block 288, and a loop is made back to block 276 to set the BUS_NO and SUB_BUS_NO registers of the remaining bridges.

First the value of 4 is copied into the BUS_NO of host bridge B. Then subroutine 300 is called, but it counts no PCI bridges on PCI bus E. Thus, it returns in block 320 with BNO_MAX equal to 4, and block 286 causes this value to be written into the SUB_BUS_NO of host bridge B.

The ii value is not yet equal to NO_HB. Thus, after block 288 sets BNO_MIN to 5 by adding 1 to BNO_MAX, decision step 290 causes a loop back to block 276. Block 284 writes 5 into the BUS_NO of host bridge C, then block 282 calls subroutine 300.

Subroutine 300 must make a second layer call to find and count bus G. The BUS_NO and SUB_BUS_NO register of PCI bridge F1 are then set during the call to subroutine 300, and a BNO_MAX value of 6 is returned to block 282.

The value of ii is now equal to NO_HB meaning that all BUS_NO and SUB_BUS_NO registers have been set. Thus, block 292 sets all bit numbers of CONFIG_ENBL to high so that the configuration software can access the internal registers of the host bridges. The configuration software now has a preliminary map to locate all bridges, peripheral devices and buses in a multiple bus network.

Accordingly, the preferred embodiment of a method and apparatus used to generate a preliminary map for initialization of a multiple bus computer system has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information handling system, comprising:

a central processing unit;

system memory;

a system bus which connects said central processing unit to said system memory so that said central processing unit can read data from, and write data to, said system memory;

at least one peripheral bus connected to said system bus for connecting peripheral devices thereto so that said central processing unit can write data to, and read data from, said peripheral devices;

said at least one peripheral bus, if more than one, being connected together in a plurality of peer and hierarchical combinations by bus-to-bus bridges, said peripheral buses that are directly connected to said system bus being primary peripheral buses and the remainder of said peripheral buses being arranged below the primary buses in various layers of a hierarchy;

said primary peripheral buses each being directly connected to said system bus through a corresponding host bridge;

a program stored in said system memory that said central processing unit executes to create a map of all of said peripheral buses so that the central processing unit can locate all of said peripheral devices in order to configure said peripheral devices; and said program having the capability to call a subroutine for each of said primary buses to count the number of peripheral buses in each hierarchy connected to the primary bus and to assign an identification number to each bus in said hierarchy.

2. The information handling system of claim 1 wherein said program includes the steps of:

counting the number of said primary peripheral buses;

assigning a minimum value to a variable;

incrementing said variable after each call to said subroutine by the number of buses counted by said subroutine;

assigning a first range number to each primary bus equal to the value of said variable prior to said call to said subroutine corresponding to said primary bus; and assigning a second range number to each primary bus equal to the number of buses connected in said hierarchy corresponding to said primary peripheral bus, plus the value of said variable prior to the execution of said call to said subroutine for each primary peripheral bus, minus one.

3. The information handling system of claim 2 wherein said step of calling a subroutine includes the steps of:

executing a call to said subroutine for each said peripheral bus in said hierarchy, a first call to said subroutine being executed for said primary peripheral bus;

assigning a first range value to each of said peripheral buses for which a particular call to said subroutine is to be executed, before executing said particular call, equal to said variable plus one;

incrementing said variable by one before executing said particular call;

counting the peripheral buses attached to each said peripheral bus for which a call to said subroutine is executed;

returning from said particular call of said subroutine only if the number of peripheral buses attached to said peripheral bus for which said particular call was executed is equal to zero, or a call to said subroutine has been executed for all peripheral buses attached to said peripheral bus for which said particular call to said subroutine was executed; and assigning a second range value to said peripheral bus for which said particular call was executed equal to said variable after returning from said particular call; and writing said first and second range values for each said peripheral bus into separate registers in a corresponding bus-to-bus bridge directly above each said peripheral bus in said hierarchy.

4. The information handling system of claim 3 including the step of:

setting temporary values for said first and second range values for each of said peripheral buses attached to a particular peripheral bus before a call to said subroutine is executed for each of said buses.

5. The information handling system of claim 3 including the step of:

creating a table of signals for each of said peripheral buses, said table indicating the signal on said peripheral buses that will enable each of said bus-to-bus bridges and said peripheral devices connected to said peripheral bus that corresponds to said table, so that said central processing unit can write data to or read data from each of said bus-to-bus bridges and said peripheral devices.

6. The information handling system of claim 3 wherein:

said peripheral buses attached to said peripheral bus for which said particular call to said subroutine is executed are counted by counting the number of said bus-to-bus bridges attached to said peripheral bus for which said particular call to said subroutine is executed.

7. The information handling system of claim 6, wherein said bus-to-bus bridges include an internal register that has a least significant bit set to a predefined binary state and said bus-to-bus bridges are counted by sampling said least significant bits.

8. The information handling system of claim 2, wherein said primary peripheral buses are counted by counting the number of said host bridges connected to said system bus.

9. The information handling system of claim 2, including a register comprised of a plurality of bits, each of said bits having the capability of being connected through said system bus to one of said host bridges, such that if one of said bits is a binary high, said one of said host bridges is enabled so that said central processing unit can write data to or read data from said one of said host bridges.

10. The information handling system of claim 2, wherein said program includes the step of:

writing said first and second range numbers of each said primary peripheral bus into separate registers in said corresponding host bridges.

11. The information handling system of claim 1, wherein said peripheral buses are PCI buses.

12. A method of initializing multiple peripheral buses in an information handling system, comprising the steps of:

providing a central processing unit;

providing a system memory;

providing a system bus which connects said central processing unit to said system memory so that said central processing unit can read data from, and write data to, said system memory;

providing at least one peripheral bus connected to said system bus for connecting peripheral devices thereto so that said central processing unit can write data to, and read data from, said peripheral devices;

connecting each of said peripheral buses, if more than one, together in a plurality of peer and hierarchical combinations through bus-to-bus bridges, said peripheral buses that are directly connected to said system bus being primary peripheral buses and the remainder of said peripheral buses being arranged below the primary buses in various layers of a hierarchy;

connecting each of said primary peripheral buses to said system bus through a corresponding host bridge;

executing a program stored in said system memory that creates a map of all of said peripheral buses so that the central processing unit can locate all of said peripheral devices in order to configure said peripheral devices; and calling a subroutine for each of said primary buses to count the number of peripheral buses in each hierarchy connected to the primary bus and to assign an identification number to each bus in said hierarchy.

13. The method of claim 12 wherein said peripheral buses are PCI buses.

14. A method of initializing bus-to-bus bridges in a multiple bus information handling system including the steps of:

calling a subroutine for each of said primary buses to count(s) the number of buses connected in a hierarchy beneath each of said buses assigning an identification numbers to each of said buses connected in each of said hierarchies;

incrementing a predetermined variable after each call to said subroutine based on the number of buses counted by said subroutine;

assigning a first range number to each of said buses; said first range corresponding to the value of said variable prior to said call to said subroutine; and assigning a second range number to each of said buses; said second range corresponding to the number of buses connected in said hierarchy beneath each of said buses and the value of said variable prior to said call to said subroutine corresponding to each bus.

15. The method of claim 14, wherein said step of calling a subroutine includes the steps of:

executing a call to said subroutine for each of said buses in said hierarchy;

assigning a first range value to each of said buses for which a particular call to said subroutine is to be executed equal to said variable plus one, before executing said particular call;

incrementing said variable by one before executing said particular call;

counting the buses attached to said bus for which said particular call was executed;

returning from said particular call of said subroutine only if the number of peripheral buses attached to said peripheral bus for which said particular call was executed is equal to zero, or a call to said subroutine has been executed for all buses attached to said bus for which said particular call to said subroutine was executed; and assigning a second range value to said bus for which said particular call was executed equal to said variable after returning from said particular call; and writing said first and second range values for each said bus into separate registers in a corresponding bus-to-bus bridge directly above each said bus in said hierarchy.

16. The method of claim 15, including the step of:

setting temporary values for said first and second range values for each of said buses attached to a particular peripheral bus before a call to said subroutine is executed for each of said buses.

17. The method of claim 15, including the step of:

creating a table of signals for each of said buses, said table listing a signal for each said bus-to-bus bridge and said peripheral device that is connected to said bus corresponding to said table, said signals being used by said central processing unit to enable said bus-to-bus bridges and peripheral devices to access write data to, or read data, from said bus-to-bus bridges and said peripheral devices.

18. The method of claim 14 wherein said buses are PCI buses.

19. A multiple-bus information handling system comprising:

a central processing unit;

a plurality of hierarchial peripheral buses for connecting peripheral devices thereto so that said central processing unit can write data to, and read data from; said plurality of peripheral buses including at least one primary peripheral bus at a higher level of hierarchy wherein the remainder of lower level peripheral buses being arranged below the primary buses in various layers of hierarchy;

a plurality of bus-to-bus bridges for coupling said hierarchial peripheral buses through a corresponding bus-to-bus bridge;

a counter for repetitively counting the number of peripheral buses connected in a hierarchy beneath each of said primary buses; and identification assignment means for assigning an identification numbers to each of said buses connected in each of said hierarchies based on the number of peripheral buses connected in the hierarchy beneath each of said primary buses.

20. The multiple-bus information handling system of claim 19, wherein said identification assignment means further including;

incrementing means for incrementing a variable after each count based on the number of peripheral buses connected in the hierarchy beneath each of said primary buses; wherein said identification number of said buses determined based on the number of peripheral buses connected in the hierarchy beneath each of said primary buses and the variable.

21. The multiple-bus information handling system of claim 20 further including:

a first assignment means for assigning a first range number to each of said buses corresponding to the value of said variable prior to said count; and a second assignment means for assigning a second range number to each of said buses corresponding to the number of buses connected in said hierarchy beneath each of said buses plus the value of said variable prior to said count to said subroutine corresponding to each bus.

22. The multiple-bus information handling system of claim 21, wherein said second range is equal to the value of said variable prior to said count minus one.

23. The multiple-bus information handling system of claim 19, wherein said peripheral bus is substantially peripheral component interconnect (PCI) bus compliant.

* * * * *